(12) United States Patent
Ishikawa et al.

(10) Patent No.: US 11,378,835 B2
(45) Date of Patent: Jul. 5, 2022

(54) DISPLAY DEVICE AND LIQUID CRYSTAL DISPLAY DEVICE

(71) Applicant: Japan Display Inc., Tokyo (JP)

(72) Inventors: Tomokazu Ishikawa, Tokyo (JP); Hitomi Hasegawa, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 253 days.

(21) Appl. No.: 16/549,179

(22) Filed: Aug. 23, 2019

(65) Prior Publication Data

US 2020/0064682 A1  Feb. 27, 2020

(30) Foreign Application Priority Data

Aug. 23, 2018  (JP) .............................. JP2018-156458

(51) Int. Cl.
*G02F 1/1335* (2006.01)
*G02F 1/1343* (2006.01)
*G02F 1/1368* (2006.01)

(52) U.S. Cl.
CPC .. *G02F 1/133512* (2013.01); *G02F 1/133514* (2013.01); *G02F 1/134336* (2013.01); *G02F 1/1368* (2013.01); *G02F 1/13685* (2021.01); *G02F 1/134345* (2021.01); *G02F 1/134363* (2013.01)

(58) Field of Classification Search
CPC ......... G02F 1/133512; G02F 1/134309; G02F 1/134336; G02F 1/133514; G02F 2201/52; G02F 1/134363; G02F 1/134345; G02F 2201/56; G02F 1/133707; G02F 1/13685; G02F 1/133388; G02F 1/1368
See application file for complete search history.

(56) References Cited

U.S. PATENT DOCUMENTS

| 2010/0289994 | A1 | 11/2010 | Nonaka |
| 2013/0300965 | A1* | 11/2013 | Nonaka ................. G02F 1/1368 349/42 |
| 2016/0120005 | A1* | 4/2016 | Wu ........................ H05B 33/26 313/505 |
| 2017/0322467 | A1* | 11/2017 | Tae .................... G02F 1/133512 |

(Continued)

FOREIGN PATENT DOCUMENTS

| CN | 107229154 A | 10/2017 |
| JP | 2018-91937 A | 6/2018 |

OTHER PUBLICATIONS

Chinese Office Action dated Dec. 28, 2021, in corresponding Chinese Patent Application No. 201910778547.7, 13 pp.

(Continued)

*Primary Examiner* — Hoan C Nguyen
(74) *Attorney, Agent, or Firm* — Xsensus LLP

(57) ABSTRACT

According to one embodiment, a display device includes a first area, a second area, a boundary including a linear first boundary parallel and a curved second boundary and surrounding the first area, and a light-shielding layer including a first light-shielding portion located in the second area. An end portion of the first light-shielding portion on the first area side includes a linear first end portion located on the first boundary, a curved second end portion located on the second boundary in a first round area, and a stepwise third end portion which extends such that the third end portion is bent in a second round area.

17 Claims, 22 Drawing Sheets

(56) References Cited

U.S. PATENT DOCUMENTS

| | | |
|---|---|---|
| 2018/0149932 A1 | 5/2018 | Nakamura et al. |
| 2018/0151612 A1* | 5/2018 | Zheng ...................... G09G 3/20 |
| 2019/0140026 A1* | 5/2019 | Nakanishi ......... G02F 1/133512 |
| 2019/0265824 A1* | 8/2019 | Abe ........................ G06F 3/044 |

OTHER PUBLICATIONS

Office Action dated Apr. 26, 2022, in corresponding Japanese patent Application No. 2018-156458, 4 pages.

\* cited by examiner

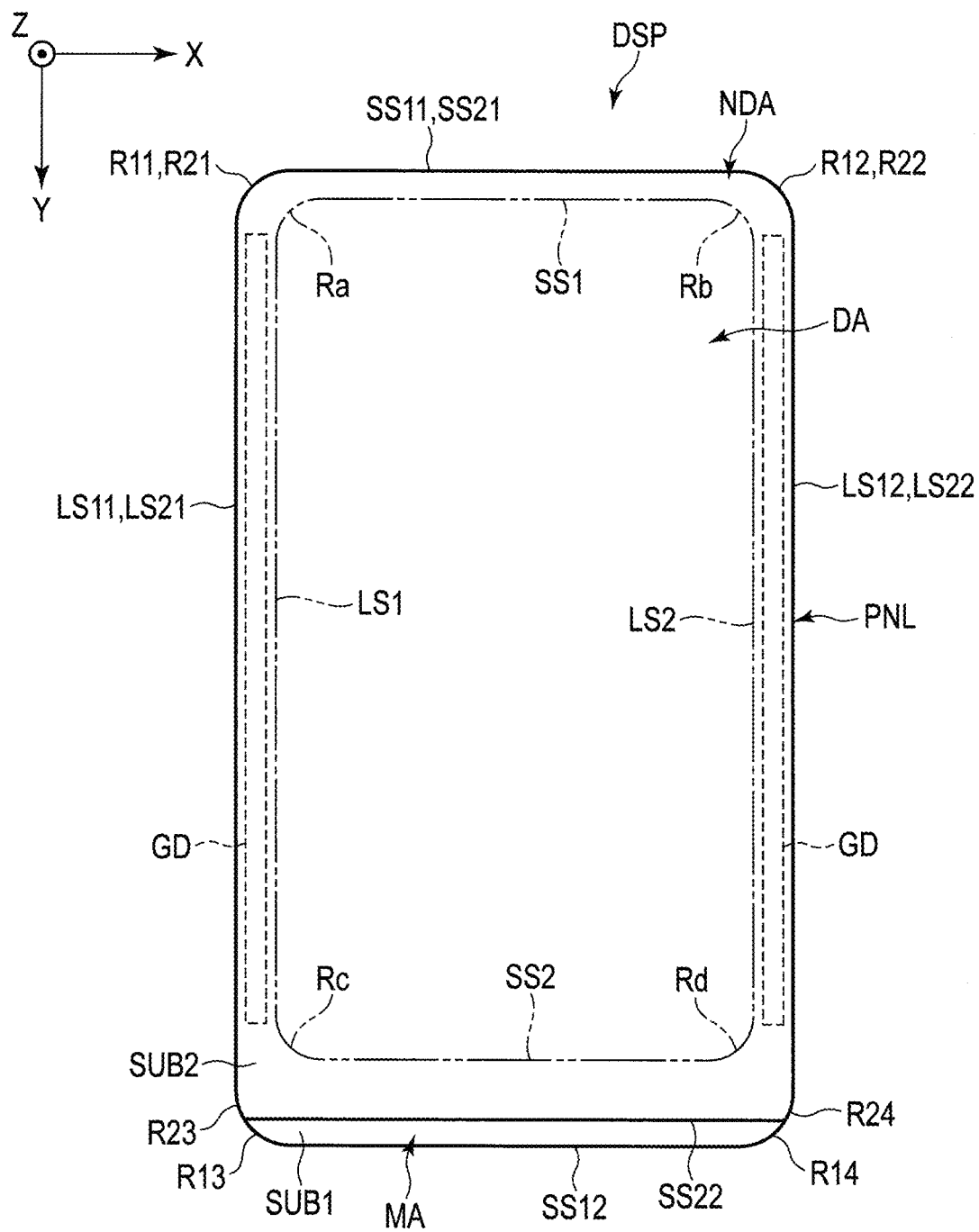
F I G. 1

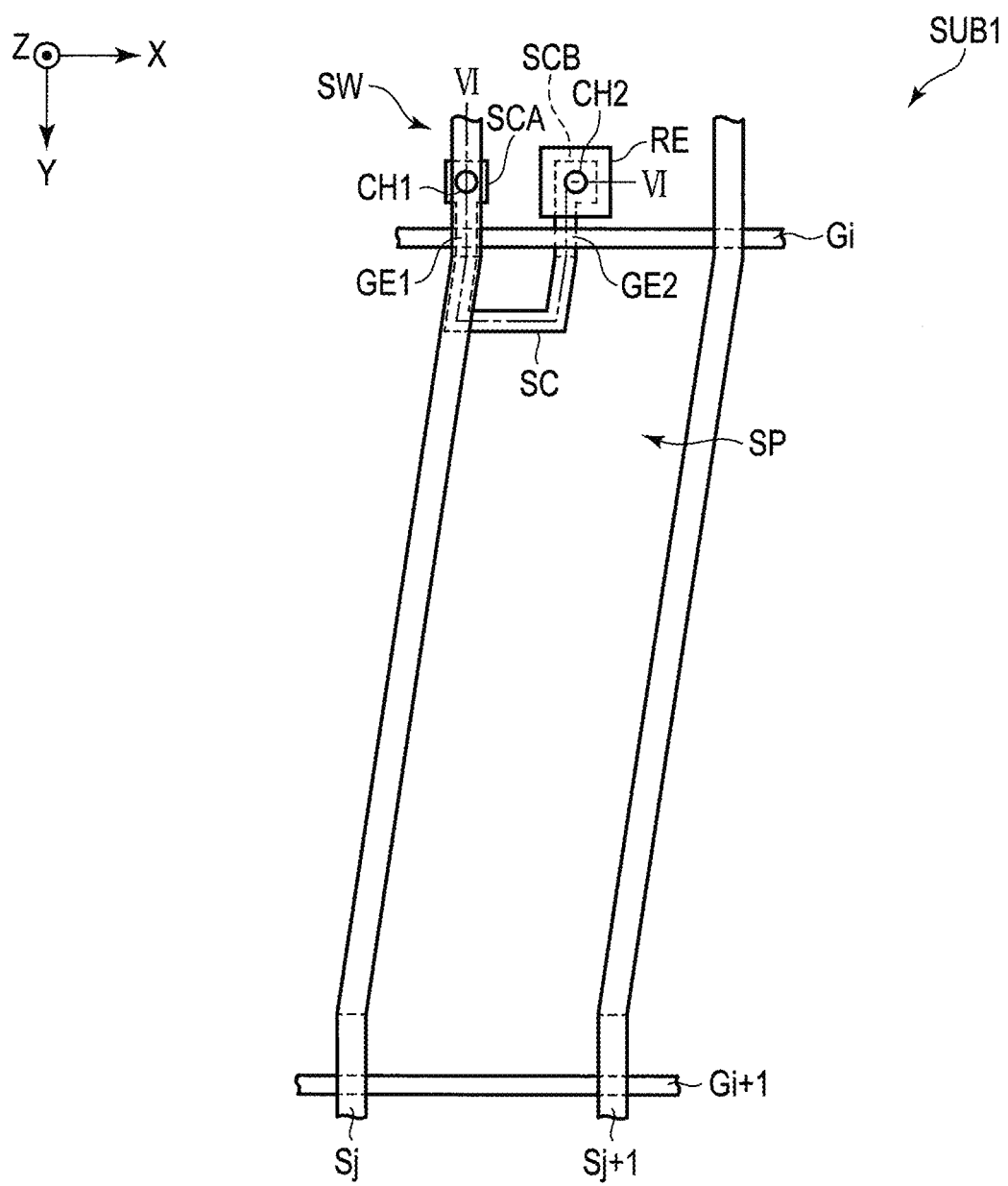
F I G. 4

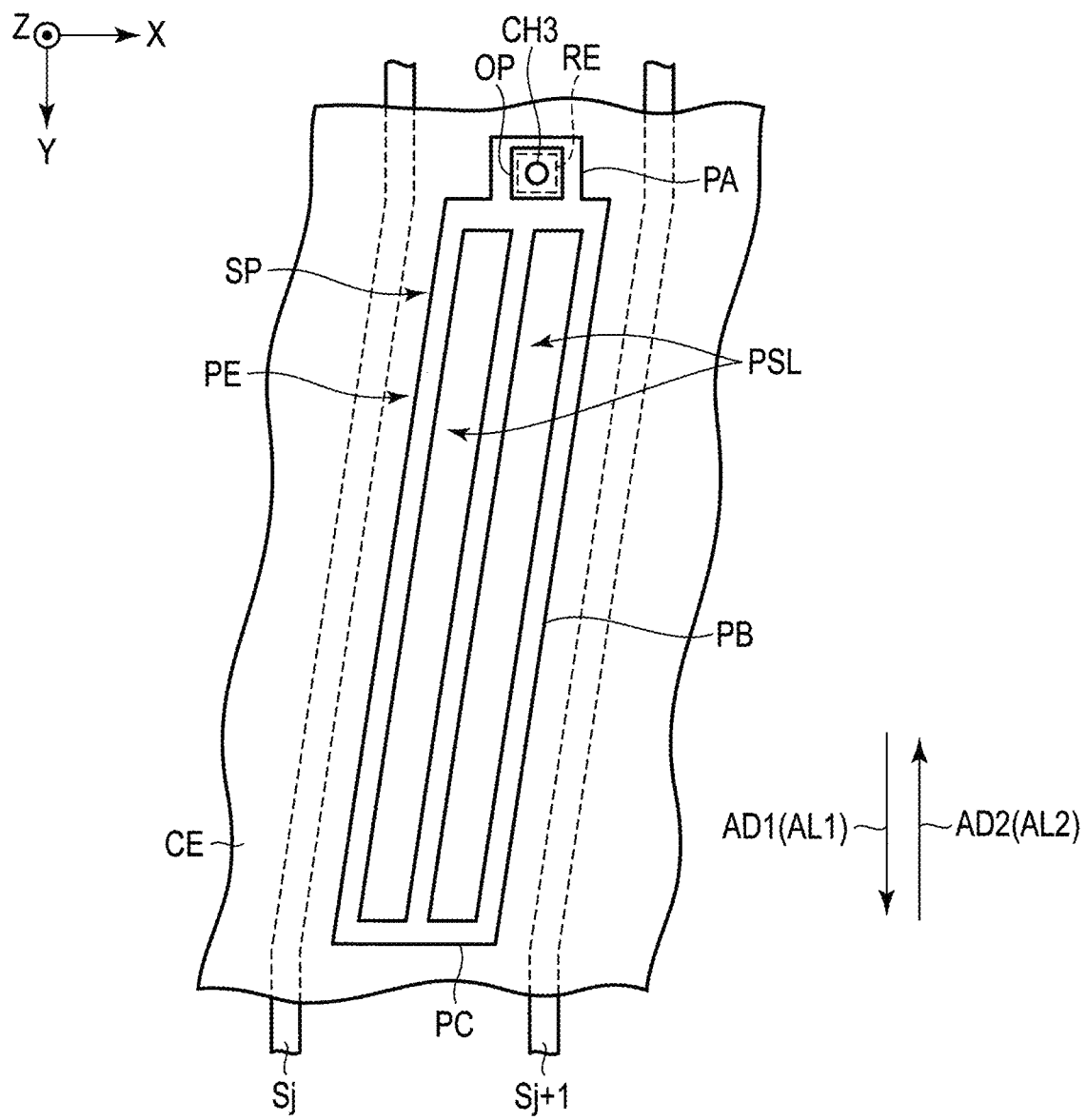
F I G. 5

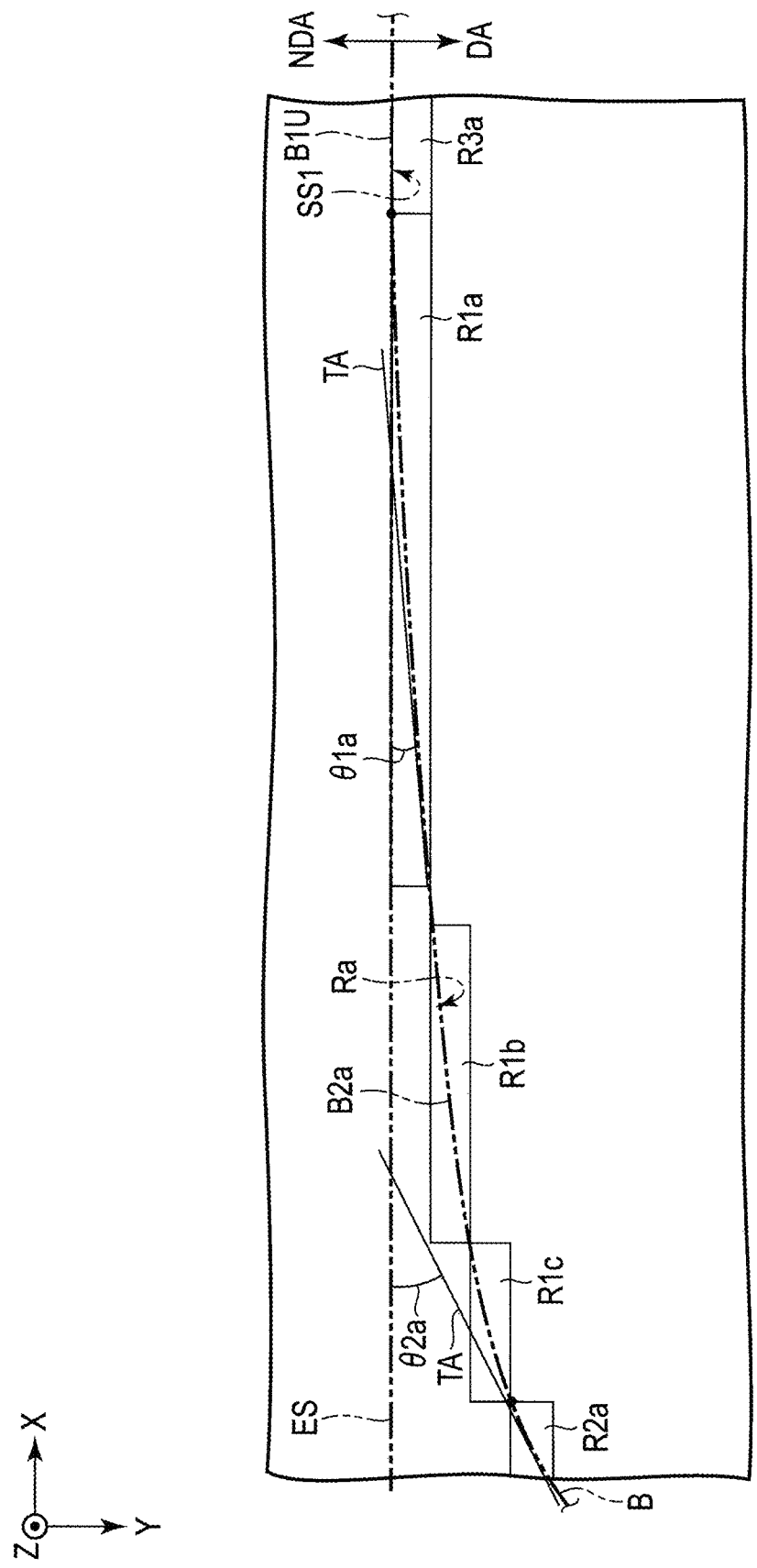
F I G. 10

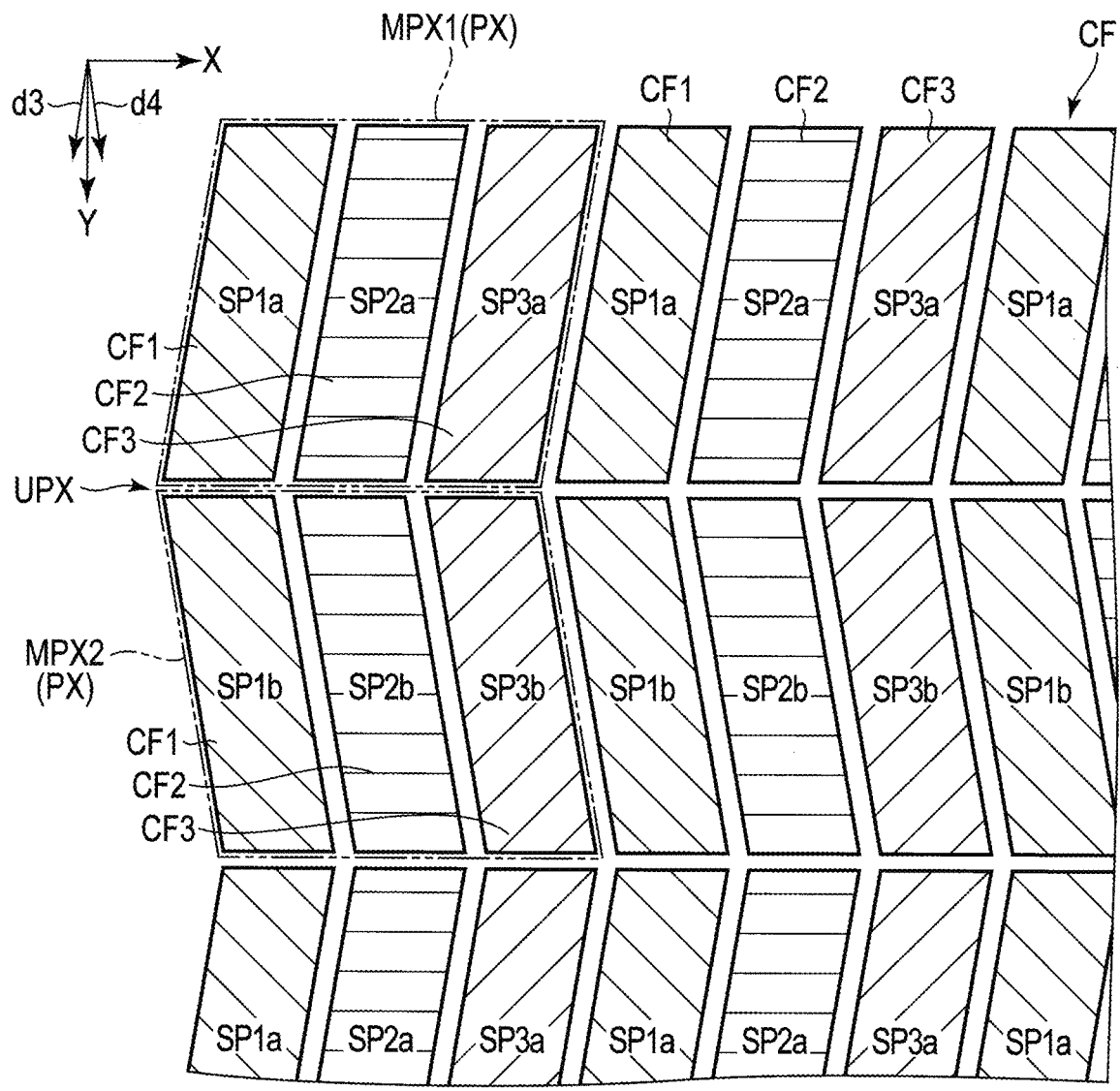
F I G. 13

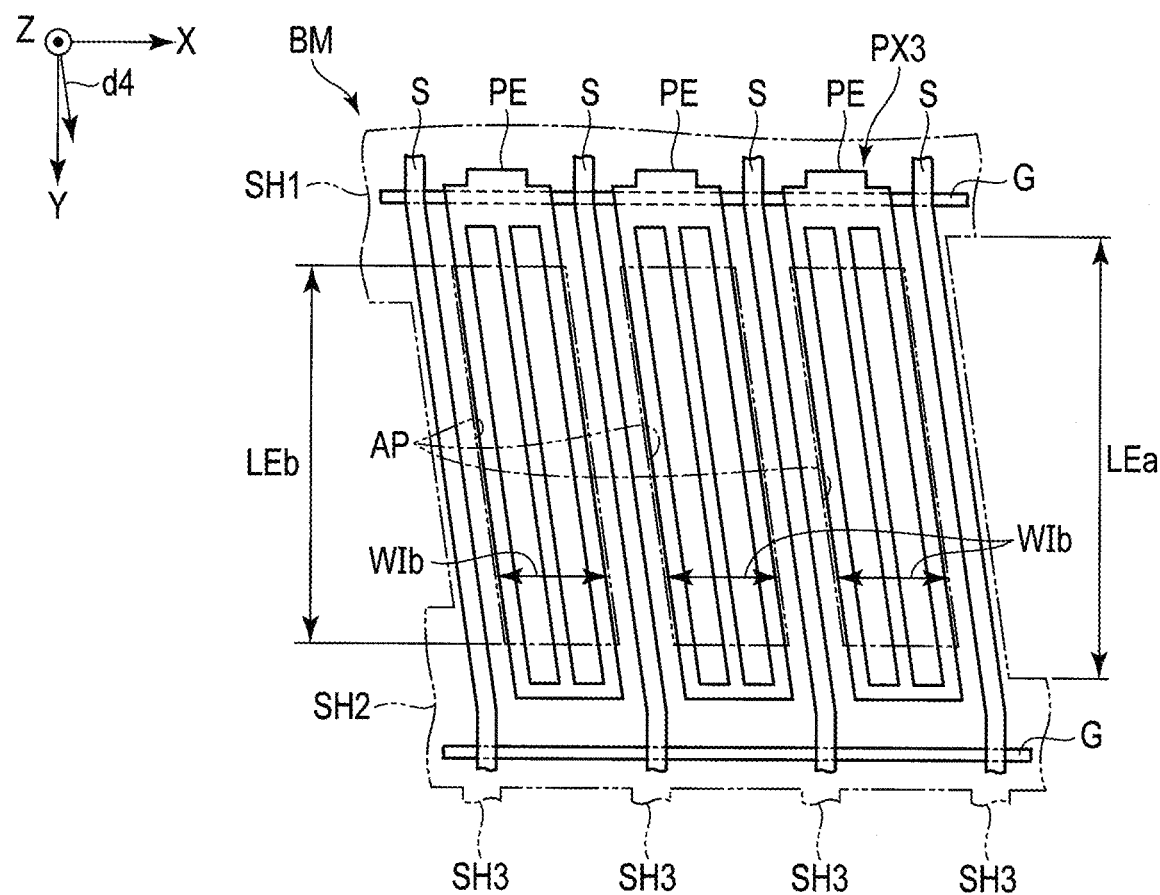
F I G. 15

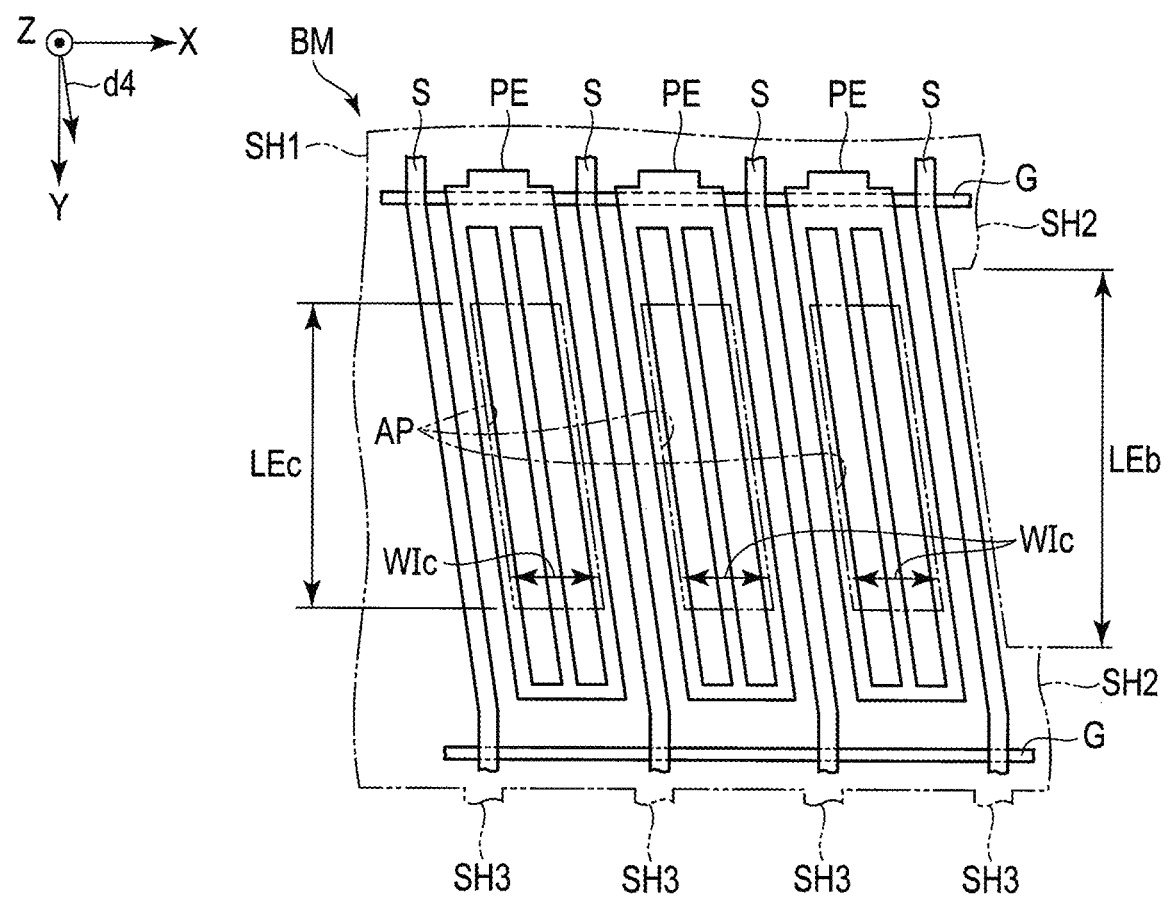
F I G. 16

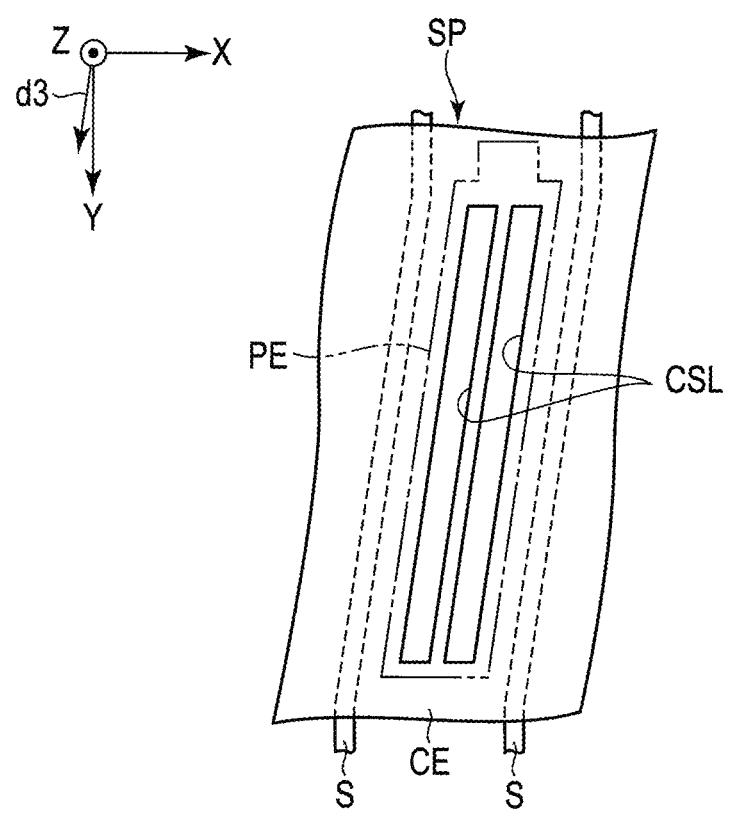
F I G. 18

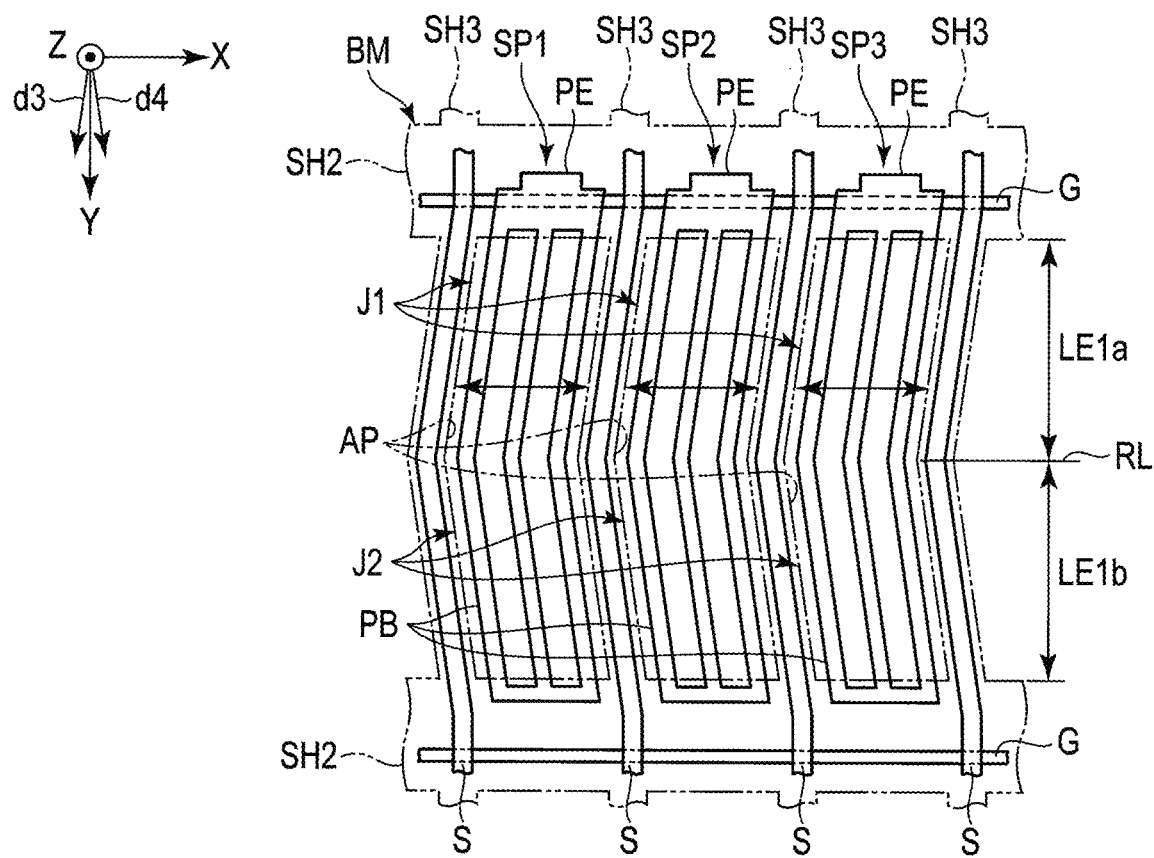
F I G. 20

DISPLAY DEVICE AND LIQUID CRYSTAL DISPLAY DEVICE

CROSS-REFERENCE TO RELATED APPLICATIONS

This application is based upon and claims the benefit of priority from Japanese Patent Application No. 2018-156458, filed Aug. 23, 2018, the entire contents of which are incorporated herein by reference.

FIELD

Embodiments described herein relate generally to a display device and a liquid crystal display device.

BACKGROUND

As a display device, a liquid crystal display device is known. A liquid crystal display device is used in various types of fields as the display device of office automation (OA) equipment, etc., such as a personal computer and a television, utilizing the characteristics such as lightness, slimness and low energy consumption. Recently, a liquid crystal display device is used as the display device of a mobile device such as a mobile phone, car navigation equipment, a game console, etc.

The shape of a display area which displays an image is required to be adapted to a non-rectangle such as a circle or ellipse in addition to a rectangle having four right-angled corners.

BRIEF DESCRIPTION OF THE DRAWINGS

FIG. 1 is a plan view showing the external appearance of a display device according to an embodiment.

FIG. 4 is a plan view showing a structural example of a subpixel when the first substrate shown in FIG. 1 is viewed from the second substrate side.

FIG. 5 is a plan view showing a structural example of a pixel electrode provided in a subpixel.

FIG. 10 is a plan view showing the area including the round portion and the short side shown in FIG. 7, and is shown for explaining a method for distinguishing a first round area from a second round area.

FIG. 13 is a plan view showing an array of pixels in the display panel.

FIG. 15 is a plan view showing a third pixel of the display panel, and shows scanning lines, signal lines, pixel electrodes and the light-shielding layer.

FIG. 16 is a plan view showing a fourth pixel of the display panel, and shows scanning lines, signal lines, pixel electrodes and the light-shielding layer.

FIG. 18 is a plan view showing a structural example of a common electrode and a pixel electrode provided in a pixel of the display device of modification example 2 of the embodiment.

FIG. 20 is a plan view showing the first pixel shown in FIG. 19, and shows scanning lines, signal lines, pixel electrodes and the light-shielding layer.

DETAILED DESCRIPTION

Figure 2:
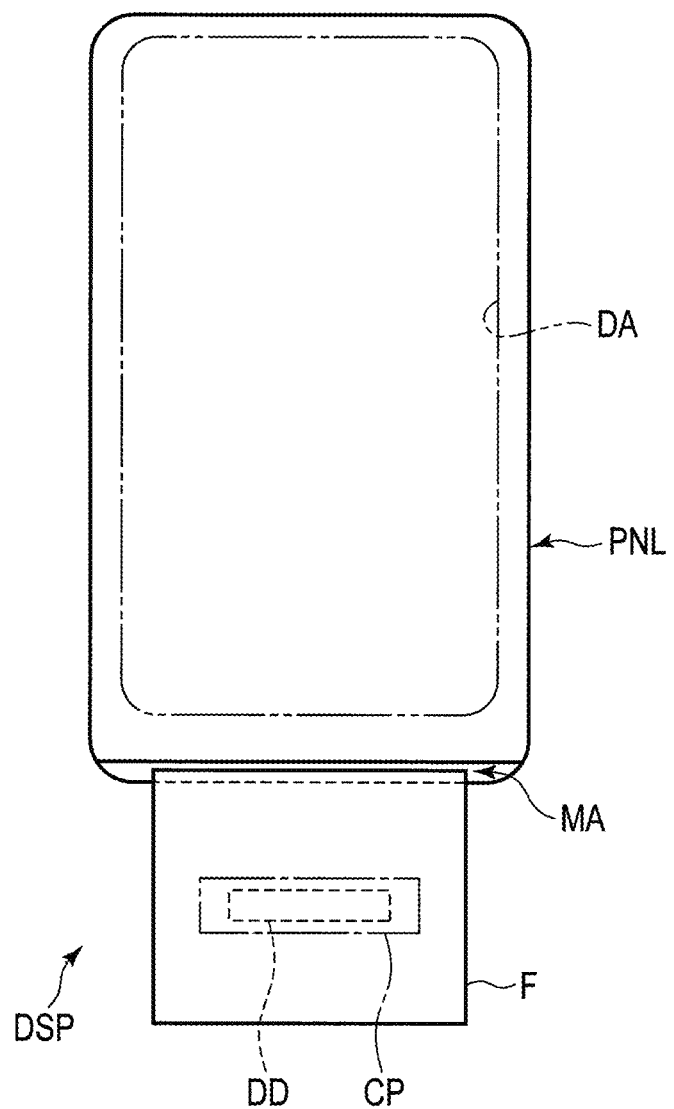
FIG. 2 is a plan view showing a structural example in which signal sources are mounted in the display panel shown in FIG. 1.

In general, according to one embodiment, there is provided a display device comprising: a first area; a second area adjacent to the first area; a boundary between the first area and the second area, the boundary comprising a linear first boundary parallel to a first direction and a curved second boundary connected to the first boundary, the boundary surrounding the first area; and a light-shielding layer comprising a first light-shielding portion located in the second area, and adjusting a light-transmissive area. An end portion of the first light-shielding portion on the first area side comprises: a linear first end portion located on the first boundary; a curved second end portion located on the second boundary in a first round area through which the second boundary passes and in which an angle between a tangent to the second boundary and an extension of the first boundary is less than a reference value; and a stepwise third end portion which extends such that the third end portion is bent in a second round area through which the second boundary passes and in which the angle is greater than or equal to the reference value.

According to another embodiment, there is provided a display device comprising: a first area; a second area adjacent to the first area; a boundary between the first area and the second area, the boundary comprising a linear first boundary parallel to a first direction and a curved second boundary connected to the first boundary, the boundary surrounding the first area; a plurality of pixels arranged in matrix in the first direction and a second direction intersecting the first direction, each of the pixels comprising a plurality of subpixels of a plurality of colors arranged in the first direction; and a light-shielding layer comprising a first light-shielding portion located in the second area, and forming an outline of an aperture region of each of the subpixels. The pixels include: N or more pixels continuously arranged in the first direction in a first round area through which the second boundary passes; a pixel located in a second round area through which the second boundary passes, or less than N pixels continuously arranged in the first direction in the second round area; and a plurality of pixels located in a first display area which includes a straight area and does not include the first round area and the second round area, the straight area through which the first boundary passes and which extends in parallel with the first boundary in the first area. An end portion of the first light-shielding portion on the first area side comprises: a linear first end portion located on the first boundary in the straight area; a curved second end portion located on the second boundary in the first round area; and a stepwise third end portion which extends such that the third end portion is bent in the first direction and the second direction in the second round area.

According to another embodiment, there is provided a liquid crystal display device comprising: a substrate comprising a short side in a first direction, a long side in a second direction and a round portion connecting the short side and the long side; and a plurality of pixels formed on the substrate and comprising a plurality of aperture regions defined by a light-shielding layer. The pixels include a first pixel group comprising a first aperture region provided along the short side, a second pixel group comprising a second aperture region provided along the round portion, and a third pixel group comprising a third aperture region provided along the round portion. The light-shielding layer includes a first linear portion formed along the short-side side of the first aperture region, a curved portion formed along the round portion side of the second aperture region, and a second linear portion formed along the short-side side of the third aperture region. The first aperture region is larger than the third aperture region.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

In the beginning, the basic idea of the embodiments of the present invention is explained.

In a color display type of liquid crystal display device, each pixel comprises, for example, red, green and blue subpixels. When part of the subpixels constituting each pixel is shielded from light by a light-shielding member provided on the external side of a liquid crystal display panel, the color balance of pixels may be lost. Thus, the displayed color may be different from a desired color. For example, when only part of the red subpixel is shielded from light, the aperture ratio (light transmittance or light reflectance) of red is reduced in the pixel as a whole. Thus, a desired color cannot be displayed.

To prevent this color deviation, each pixel in which part of the subpixels is shielded from light may be entirely shielded by a light-shielding layer such as a black matrix. However, in this method, the display area is reduced by the shielded portion. Further, the edge of the display area is formed by a dot-pattern. Thus, the smoothness of the outline of the round portion of the display area becomes insufficient, thereby degrading the visual quality. It goes without saying that the outline of the round portion is nonlinear and curved. It is assumed that the round portion of the display area refers to a corner portion which seems to be bent or curved when it is viewed by the user of the display device in normal use. The round portion does not refer to a microscopic portion which is round when it is viewed with an optical device such as a microscope.

Each embodiment of the present invention provides a liquid crystal display device with excellent display quality by investigating the cause of the above problem and solving the problem. Now, this specification explains the means and methods for solving the problem.

Embodiment

This specification explains a display device according to an embodiment.

FIG. 1 is a plan view showing the external appearance of the display device DSP according to the embodiment. The plan view shows the display device DSP in the X-Y plane defined by a first direction X and a second direction Y intersecting each other. In the figure, a fifth direction Z is a direction intersecting the first direction X and the second direction Y. For example, the first direction X, the second direction Y and the fifth direction Z intersect at right angles. However, they may intersect at other angles. In this specification, the direction of the arrow indicating the fifth direction Z is referred to as "upward" (or toward the upper side). The opposite direction of the arrow indicating the fifth direction Z is referred to as "downward" (or toward the lower side). It is assumed that the position of observation for observing the display device DSP is on the point side of the arrow indicating the fifth direction Z. A plan view is defined as appearance when the X-Y plane is viewed from the position of observation.

In the present embodiment, the display device DSP is a liquid crystal display device. The display device DSP comprises a display panel PNL, etc. The display panel PNL is a liquid crystal display panel and comprises a first substrate SUB1 as an array substrate, a second substrate SUB2 as a counter-substrate and a liquid crystal layer (the liquid crystal layer LC described later). The second substrate SUB2 faces the first substrate SUB1 with a predetermined gap therebetween. The display panel PNL comprises a display area DA which displays an image, and a non-display area NDA other than the display area DA. In the present embodiment, the non-display area NDA surrounds the display area DA and has a frame shape. The non-display area NDA includes a mounting area MA in which signal sources such as an IC chip and a flexible printed circuit are mounted.

Regarding the external appearance of the display panel PNL, the first substrate SUB1 comprises a pair of short sides SS11 and SS12 extending in the first direction X, a pair of long sides LS11 and LS12 extending in the second direction Y and four round portions R11 to R14. The second substrate SUB2 comprises a short side SS21 overlapping the short side SS11, long sides LS21 and LS22 overlapping the long sides LS11 and LS12, respectively, round portions R21 and R22 overlapping the round portions R11 and R12, respectively, and a short side SS22. The short side SS22 does not overlap the short side SS12. More specifically, the second substrate SUB2 comprises a round portion R23 connecting the short side SS22 and the long side LS21 and a round portion R24 connecting the short side SS22 and the long side LS22. The round portion R23 partially overlaps the round portion R13. The round portion R24 partially overlaps the round portion R14. The mounting area MA is located between the short side SS12 and the short side SS22 on the first substrate SUB1.

The display area DA comprises a pair of short sides SS1 and SS2 extending in the first direction X, a pair of long sides LS1 and LS2 extending in the second direction Y and four round portions Ra, Rb, Rc and Rd. The short sides SS1 and SS2 and the long sides LS1 and LS2 are equivalent to linear portions connecting adjacent round portions.

More specifically, between the round portions R indicating the outline of the display area DA and their corresponding round portions R of the first and second substrates SUB1 and SUB2, the radii of curvature defining the round portions R may be equal to each other or may be different from each other.

The width of the mounting area MA, that is, the distance between the short side SS12 and the short side SS22, is substantially equal to, or less than or equal to the width of the non-display area NDA on the longitudinal side, that is, the distance between the long side LS1 and the long side LS11 (the distance between the long side LS2 and the long side LS12).

The display panel PNL of the present embodiment may be a transmissive display panel which comprises a transmissive display function for displaying an image by selectively transmitting light from the rear side of the first substrate SUB1, a reflective display panel which comprises a reflective display function for displaying an image by selectively reflecting light from the front side of the second substrate SUB2, or a transreflective display panel which comprises a transmissive display function and a reflective display function.

FIG. 2 is a plan view showing a structural example in which signal sources are mounted on the display panel PNL shown in FIG. 1.

As shown in FIG. 2, the display device DSP comprises a flexible printed circuit F mounted in the mounting area MA of the display panel PNL, and an IC chip CP mounted on the flexible printed circuit F. For example, a display driver DD which outputs signals necessary for image display is incorporated into the IC chip CP. In the figure, the IC chip CP is indicated by alternate long and short dash lines. The display driver DD is indicted by dashed lines. Thus, a chip-on-film (COF) structure is provided. Here, the display driver DD includes at least part of a signal line drive circuit SD, a scanning line drive circuit GD and a common electrode drive circuit CD as described later. It should be noted that the structure is not limited to the example shown in the figure. The IC chip CP may be mounted in the mounting area MA. In other words, a chip-on-glass (COG) structure may be provided. In the present embodiment, the core substrate (first insulating substrate 10 described later) of the first substrate SUB1 is a glass substrate. However, the core substrate may be a substrate other than a glass substrate, such as a flexible resinous substrate.

Figure 3:
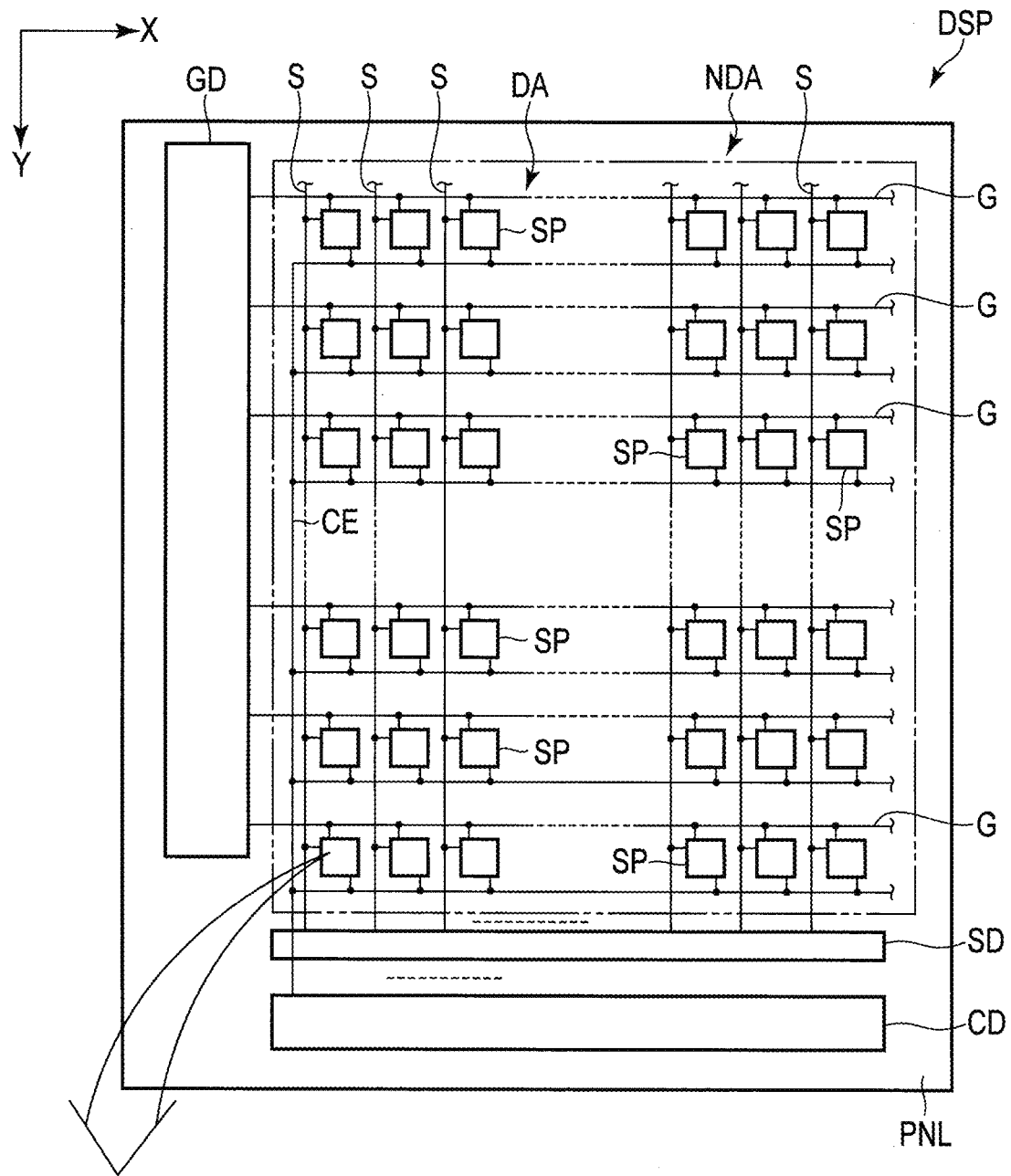
FIG. 3 shows the basic structure and the equivalent circuit of the display panel shown in FIG. 1.
Figure 3:
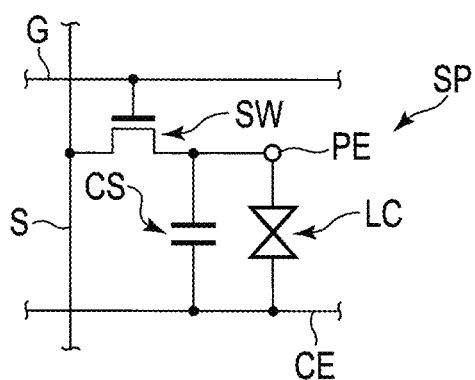

FIG. 3 shows the basic structure and the equivalent circuit of the display panel PNL shown in FIG. 1.

As shown in FIG. 3, the display panel PNL comprises a plurality of subpixels SP in the display area DA. The subpixels SP are arranged in the first direction X and the second direction Y and are arrayed in a matrix. At least three subpixels SP constitute each pixel. In the present embodiment, three subpixels SP adjacent in the first direction X constitute each pixel. The display panel PNL comprises a plurality of scanning lines G, a plurality of signal lines S, a common electrode CE, etc., in the display area DA. The scanning lines G extend in the first direction X and are arranged at intervals in the second direction Y. The signal lines S extend in the second direction Y and are arranged at intervals in the first direction X. The scanning lines G or the signal lines S may not linearly extend. They may be partially curved. The common electrode CE is provided over the subpixels SP and shared by the subpixels SP.

The scanning lines G are connected to the scanning line drive circuit GD. The signal lines S are connected to the signal line drive circuit SD. The common electrode CE is connected to the common electrode drive circuit CD. In the non-display area NDA, the signal line drive circuit SD, the scanning line drive circuit GD and the common electrode drive circuit CD may be formed on the first substrate SUB1. Alternatively, they may be partially or entirely incorporated into the IC chip CP shown in FIG. 2. For example, the scanning line drive circuit GD is provided between the long side LS1 and the long side LS11 and between the long side LS2 and the long side LS12 as shown by the dashed lines in FIG. 1. However, the layout of the drive circuits is not limited to the example shown in the drawings.

Each subpixel SP comprises a switching element SW, a pixel electrode PE, the common electrode CE, the liquid crystal layer LC, etc. The switching element SW is structured by, for example, a thin-film transistor (TFT) and is electrically connected to the scanning line G and the signal line S. The scanning line G is connected to the switching elements SW in the subpixels SP arranged in the first direction X. The signal line S is connected to the switching elements SW in the subpixels SP arranged in the second direction Y. The pixel electrode PE is electrically connected to the switching element SW. Each pixel electrode PE faces the common electrode CE, and drives the liquid crystal layer LC by the electric field generated between the pixel electrode PE and the common electrode CE. For example, storage capacitance CS is formed between an electrode having the same potential as the common electrode CE and an electrode having the same potential as the pixel electrode PE.

Here, the explanation of the detailed structure of the display panel PNL is omitted. In a display mode using a longitudinal electric field along the normal of the main surfaces of the substrates or a display mode using an inclined electric field inclined with respect to the normal of the main surfaces of the substrates, the first substrate SUB1 comprises the pixel electrodes PE, and the second substrate SUB2 comprises the common electrode CE. In a display mode using a lateral electric field along the main surfaces of the substrates, the first substrate SUB1 comprises both the pixel electrodes PE and the common electrode CE. Further, the display panel PNL may comprise a structure corresponding to a display mode appropriately using a combination of the above longitudinal electric field, lateral electric field and inclined electric field. Here, the main surfaces of the substrates are equivalent to the X-Y plane defined by the first direction X and the second direction Y.

FIG. 4 is a plan view showing a structural example of a subpixel SP when the first substrate SUB1 shown in FIG. 1 is viewed from the second substrate SUB2 side. Here, the figure shows only the structures necessary for explanation. The pixel electrode and the common electrode are omitted.

As shown in FIG. 4, the first substrate SUB1 comprises scanning lines Gi and Gi+1, signal lines Sj and Sj+1, the switching element SW, etc.

The scanning lines Gi and Gi+1 are spaced out in the second direction Y and extend in the first direction X. The signal lines Sj and Sj+1 are spaced out in the first direction X and extend in the second direction Y. In the example shown in the figure, the signal lines Sj and Sj+1 are partially bent. However, they may linearly extend in the second direction Y. The subpixel SP is equivalent to an area surrounded by the scanning lines Gi and Gi+1 and the signal lines Sj and Sj+1. The shape of the subpixel SP is not limited to the example shown in the figure. The shape of the subpixel SP may be a rectangle having long axes in the second direction Y. The shape of the subpixel SP may be arbitrarily changed.

The switching element SW is electrically connected to the scanning line Gi and the signal line Sj. The switching element SW of the example shown in the figure comprises a double-gate structure. The switching element SW comprises a semiconductor layer SC and a relay electrode RE. The semiconductor layer SC is provided such that it partially overlaps the signal line Sj and the other portion extends between the signal lines Sj and Sj+1. The semiconductor layer SC is formed into substantially a U-shape. The semiconductor layer SC intersects the scanning line Gi in an area overlapping the signal line Sj and between the signal lines Sj and Sj+1. In the present embodiment, the semiconductor layer SC intersects the scanning line Gi in two places. However, the structure is not limited to this example. The semiconductor layer SC may intersect the scanning line Gi in a single place or three places.

In the scanning line Gi, the areas overlapping the semiconductor layer SC function as gate electrodes GE1 and GE2, respectively. The semiconductor layer SC is electrically connected to the signal line Sj through a contact hole CH1 in an end portion SCA. In the other end portion SCB, the semiconductor layer SC is electrically connected to the relay electrode RE through a contact hole CH2. The relay electrode RE is formed into an island shape and is provided between the signal lines Sj and Sj+1.

FIG. 5 is a plan view showing a structural example of the pixel electrode PE provided in each subpixel SP. Here, the figure shows only the structures necessary for explanation. The scanning lines and the switching element are omitted.

As shown in FIG. 5, the pixel electrode PE is provided between the signal lines Sj and Sj+1. The pixel electrode PE comprises a contact portion PA, a main electrode portion PB and the other end portion PC. The contact portion PA, the main electrode portion PB and the other end portion PC are integrally or continuously formed and are electrically connected to each other.

The contact portion PA is provided at a position overlapping the relay electrode RE and is electrically connected to the relay electrode RE through a contact hole CH3. The main electrode portion PB has a shape along the signal lines Sj and Sj+1. In the example shown in the figure, the main electrode portion PB comprises two slits PSL extending along the signal line Sj. The two slits PSL are spaced out in the first direction X and have substantially the same width in the first direction X. The shape of the pixel electrode PE is not limited to the example shown in the figure and may be arbitrarily changed in accordance with the shape of the subpixel SP, etc. Further, the shape or the number of slits PSL is not limited to the example shown in the figure.

The common electrode CE overlaps the signal lines Sj and Sj+1. The pixel electrode PE overlaps the common electrode CE. The common electrode CE comprises an opening OP at a position overlapping the relay electrode RE.

Figure 6:
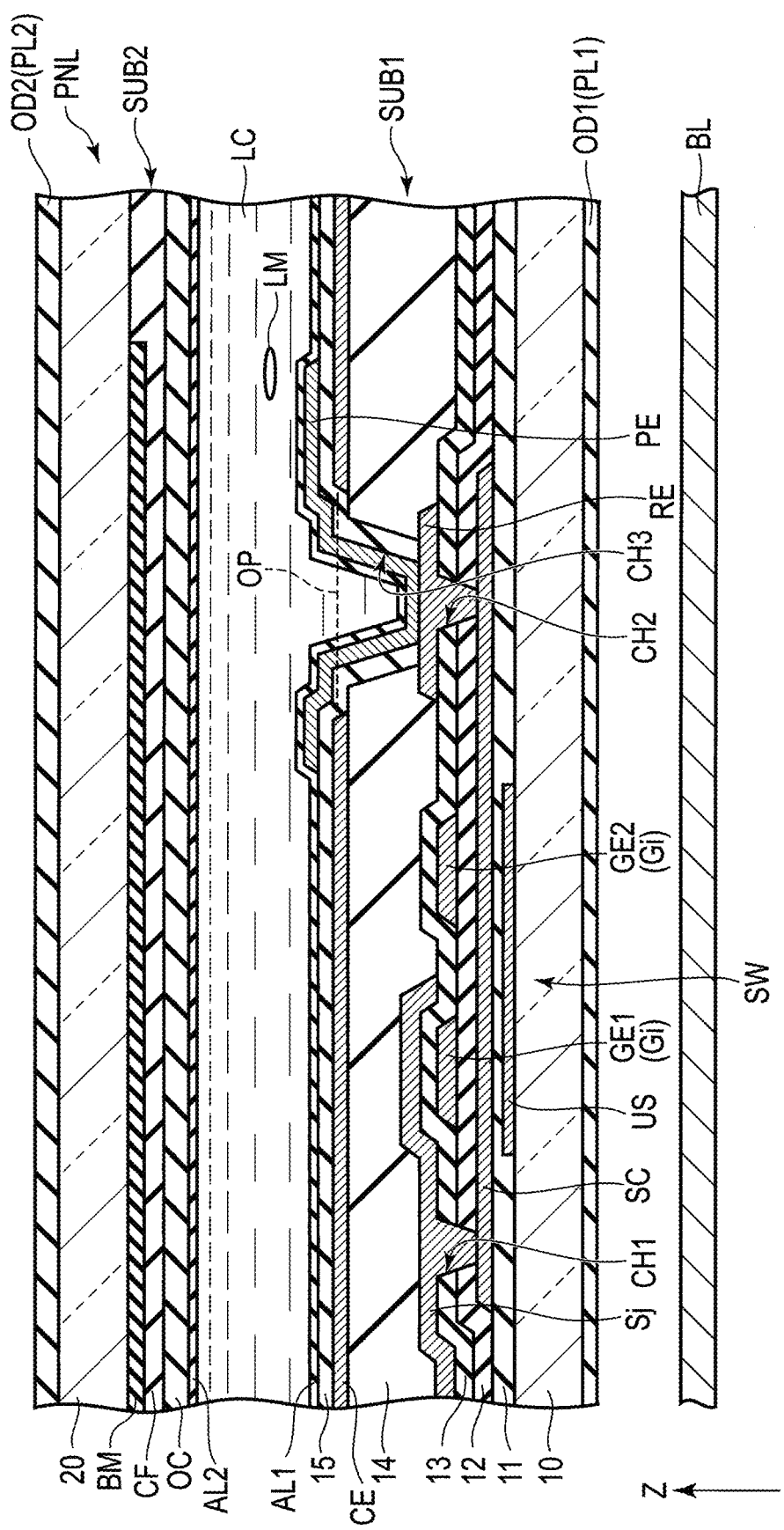
FIG. 6 is a cross-sectional view showing the display panel along the line VI-VI of FIG. 4.

FIG. 6 is a cross-sectional view showing the display panel PNL along the line VI-VI of FIG. 4. In the example shown in the figure, a fringe field switching (FFS) mode, which is one of the display modes using a lateral electric field, is applied.

As shown in FIG. 6, the first substrate SUB1 comprises the first insulating substrate 10, a first insulating layer 11, a second insulating layer 12, a third insulating layer 13, a fourth insulating layer 14, a fifth insulating layer 15, a lower light-shielding layer US, the semiconductor layer SC, the scanning line Gi, the signal line Sj, the relay electrode RE, the common electrode CE, the pixel electrode PE, a first alignment film AL1, etc.

The first insulating substrate 10 is a glass substrate. However, the first insulating substrate 10 is not limited to a glass substrate and may be an insulating substrate having a light transmitting property such as a resinous substrate. The lower light-shielding layer US is located on the first insulating substrate 10 and is covered with the first insulating layer 11. The lower light-shielding layer US blocks light from a backlight unit BL to the semiconductor layer SC. The semiconductor layer SC is located on the first insulating layer 11 and is covered with the second insulating layer 12. The semiconductor layer SC is formed of, for example, polycrystalline silicon. However, the semiconductor layer SC may be formed of amorphous silicon or an oxide semiconductor.

The gate electrodes GE1 and GE2 which are part of the scanning line Gi are located on the second insulating layer 12 and are covered with the third insulating layer 13. It should be noted that the scanning line Gi+1 (not shown) is provided in the same layer as the scanning line Gi. The scanning line Gi is formed of a metal material such as aluminum (Al), titanium (Ti), silver (Ag), molybdenum (Mo), tungsten (W), copper (Cu) and chromium (Cr), or an alloy prepared by combining these metal materials, and may have either a single-layer structure or a multi-layer structure. In the present embodiment, the scanning line Gi is formed of a molybdenum-tungsten alloy (MoW). The lower light-shielding layer US should be preferably located immediately under the semiconductor layer SC at a position facing the gate electrodes GE1 and GE2.

The signal line Sj and the relay electrode RE are located on the third insulating layer 13 and are covered with the fourth insulating layer 14. The signal line Sj+1 (not shown) is provided in the same layer as the signal line Sj. The signal line Sj and the relay electrode RE are formed of the same material. For example, the above metal materials can be applied to the signal line Sj and the relay electrode RE. The signal line Sj is in contact with the semiconductor layer SC through the contact hole CH1 penetrating the second insulating layer 12 and the third insulating layer 13. The relay electrode RE is in contact with the semiconductor layer SC through the contact hole CH2 penetrating the second insulating layer 12 and the third insulating layer 13.

The common electrode CE is located on the fourth insulating layer 14 and is covered with the fifth insulating layer 15. The pixel electrode PE is located on the fifth insulating layer 15 and is covered with the first alignment film AL1. The pixel electrode PE partially faces the common electrode CE. Each of the common electrode CE and the pixel electrode PE is a transparent electrode formed of a transparent conductive material such as indium tin oxide (ITO), indium zinc oxide (IZO) or zinc oxide (ZnO). The pixel electrode PE is in contact with the relay electrode RE through the contact hole CH3 penetrating the fourth insulating layer 14 and the fifth insulating layer 15 at a position overlapping the opening OP of the common electrode CE.

Each of the first insulating layer 11, the second insulating layer 12, the third insulating layer 13 and the fifth insulating layer 15 is an inorganic insulating layer formed of silicon oxide, silicon nitride, silicon oxynitride, etc., and may have either a single-layer structure or a multi-layer structure. The fourth insulating layer 14 is an organic insulating layer formed of acrylic resin.

The second substrate SUB2 comprises a second insulating substrate 20, a light-shielding layer BM, a color filter CF, an overcoat layer OC, a second alignment film AL2, etc.

The second insulating substrate 20 is a glass substrate. However, the second insulating substrate 20 is not limited to a glass substrate and may be an insulating substrate having a light transmitting property such as a resinous substrate. The light-shielding layer BM and the color filter CF are located on a side of the second insulating substrate 20 so as to face the first substrate SUB1. In the present embodiment, the light-shielding layer BM is provided at positions facing circuit portions such as the signal lines Sj and Sj+1, the scanning lines Gi and Gi+1 and the switching element SW shown in FIG. 4. In this case, the light-shielding layer BM is formed into a lattice shape in the display area DA. The light-shielding layer BM formed into a lattice shape is also called a black matrix. However, in a manner different from that of the present embodiment, the light-shielding layer BM may not be provided at positions facing the signal lines Sj and Sj+1. In this case, the light-shielding layer BM extends in the first direction X and is formed into a stripe shape. In any structure, the light-shielding layer BM should at least extend in the first direction X and be formed into a stripe shape.

The color filter CF is provided at a position facing the pixel electrode PE and partially overlaps the light-shielding layer BM. For example, the color filter CF comprises a plurality of first color layers, a plurality of second color layers and a plurality of third color layers. In the present embodiment, the first color is red. The second color is green. The third color is blue. However, the first, second and third colors are not limited to the present embodiment and may be other colors. The color filter CF may further include a transparent or white layer.

The overcoat layer OC covers the color filter CF. The overcoat layer OC is formed of transparent resin. The second alignment film AL2 covers the overcoat layer OC. Each of the first alignment film AL1 and the second alignment film AL2 is formed of, for example, a material having a horizontal alignment property. For example, as shown in FIG. 5, the alignment treatment direction AD1 of the first alignment film AL1 is parallel to the second direction Y. The alignment treatment direction AD2 of the second alignment film AL2 is parallel to the alignment treatment direction AD1 and is opposite to the alignment treatment direction AD1.

The color filter CF may be provided in the first substrate SUB1. The light-shielding layer BM may be provided between the color filter CF and the overcoat layer OC or between the overcoat layer OC and the second alignment film AL2. In place of the light-shielding layer BM, two or more layers of different colors may overlap each other to reduce the transmittance. Thus, the layers may function as the light-shielding layer. A white subpixel may be added. A white layer or transparent layer may be provided in the white subpixel. Without providing a transparent layer, the overcoat layer OC may be provided.

The first substrate SUB1 and the second substrate SUB2 are provided so as to face the first alignment film AL1 and the second alignment film AL2. Although not shown in the figure, a spacers are formed of a resinous material and are provided between the first substrate SUB1 and the second substrate SUB2. In this way, a predetermined cell gap is defined between the first alignment film AL1 and the second alignment film AL2. In addition to main spacers forming the cell gap, the spacers may include a sub-spacers which are not in contact with one of the substrates in a stationary state where no external stress is applied to the display panel PNL. The cell gap is, for example, 2 to 5 μm in length. The first substrate SUB1 and the second substrate SUB2 are bonded to each other by a sealing member provided in the non-display area NDA.

The liquid crystal layer LC is provided between the first substrate SUB1 and the second substrate SUB2 and is held between the first alignment film AL1 and the second alignment film AL2. The liquid crystal layer LC structures the pixels PX together with the first substrate SUB1 and the second substrate SUB2. The liquid crystal layer LC contains liquid crystal molecules LM. The liquid crystal layer LC is formed of a positive liquid crystal material (in which the dielectric anisotropy is positive) or a negative liquid crystal material (in which the dielectric anisotropy is negative).

A first optical element OD1 including a first polarizer PL1 is provided under the first substrate SUB1. A second optical element OD2 including a second polarizer PL2 is provided above the second substrate SUB2. For example, the first polarizer PL1 and the second polarizer PL2 are provided such that the respective absorption axes cross at right angles in the X-Y plane. The first optical element OD1 and the second optical element OD2 may comprise, for example, a light-scattering layer, a light-antireflective layer and a retardation plate such as a quarter-wave plate or a half-wave plate if necessary.

In this structural example, the liquid crystal molecules LM are initially aligned in a predetermined direction (for example, the second direction Y) between the first alignment film AL1 and the second alignment film AL2 in an off-state where no electric field is formed between the pixel electrode PE and the common electrode CE. In this off-state, the light emitted from the backlight unit BL to the display panel PNL is absorbed by the first optical element OD1 and the second optical element OD2, thereby performing dark display. In an on-state where an electric field is formed between the pixel electrode PE and the common electrode CE, the liquid crystal molecules LM are aligned in a direction different from the initial alignment direction by the electric field. The alignment direction is controlled by the electric field. In this on-state, the light emitted from the backlight unit BL partially passes through the first optical element OD1 and the second optical element OD2, thereby performing bright display.

Figure 7:
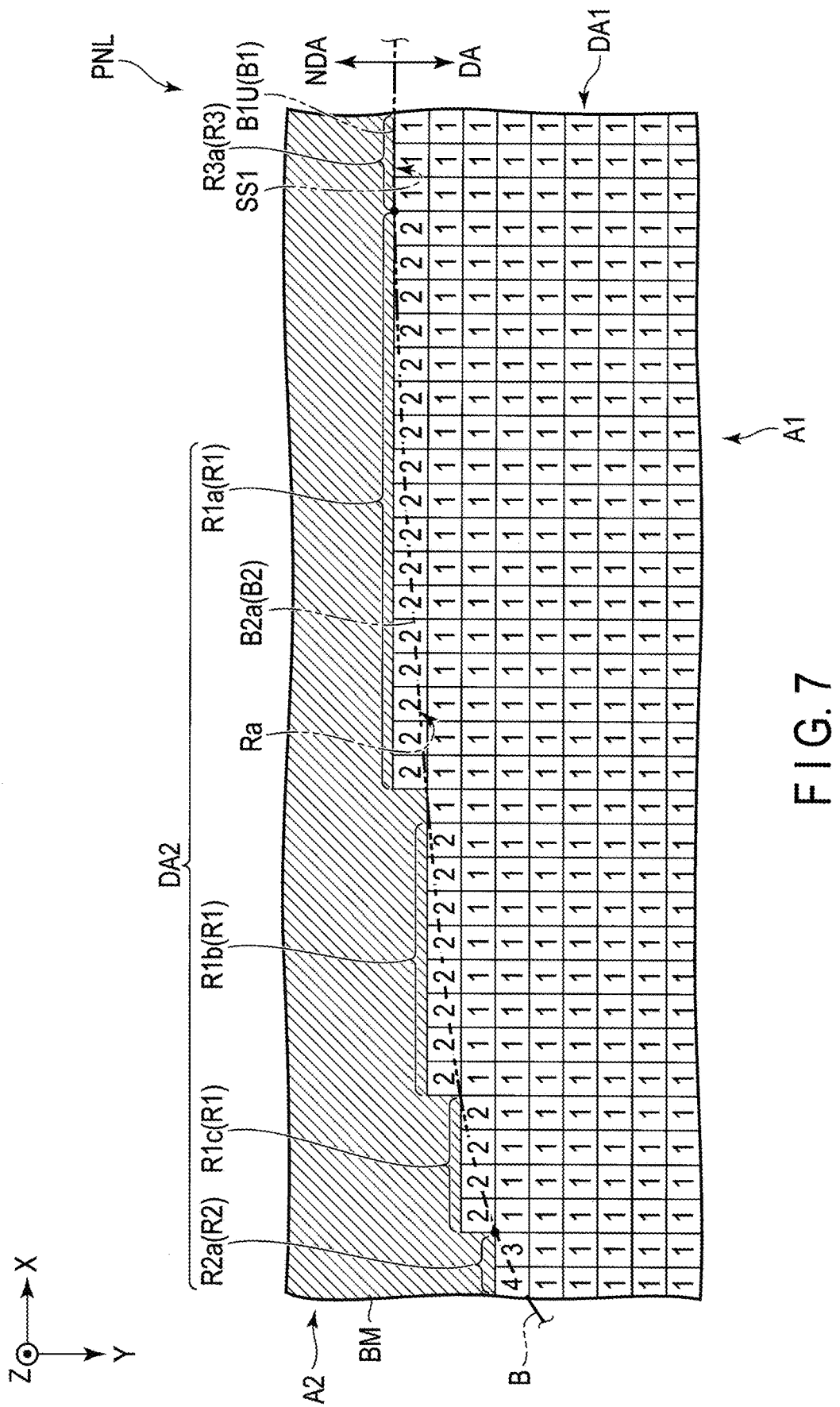
FIG. 7 is a plan view showing an area including a round portion and a short side of the display area of the display panel, and is shown for explaining the relationship between an ideal display area and a plurality of pixels.

FIG. 7 is a plan view showing an area including the round portion Ra and the short side SS1 of the display area DA of the display panel PNL, and is shown for explaining the relationship between an ideal display area and a plurality of pixels PX. The relationships between each of the round portions Ra to Rd of the display area DA shown in FIG. 1 and the pixels PX are similar to each other. Thus, the area around the round portion Ra is explained below as a typical example.

As shown in FIG. 7, the display device DSP comprises a first area A1, a second area A2 adjacent to the first area A1, and a boundary B between the first area A1 and the second area A2. In the present embodiment, the second area A2 is located on the external side of the first area A1. The first area A1 is an ideal display area. The second area A2 is an ideal non-display area (light-shielding area).

The boundary B is equivalent to an ideal outline of the display area. The boundary B comprises a linear first boundary B1 and a curved second boundary B2 connected to the first boundary, surrounds the first area A1 and has a frame shape. In the example shown in the figure, the boundary B comprises a first boundary B1U located on the upper side of the first area A1 and parallel to the first direction X, and a second boundary B2a located at the upper left of the first area A1 and connected to the first boundary B1U. The first boundary B1U and the second boundary B2a are exemplarily shown. The boundary B further comprises a plurality of first boundaries B1 corresponding to the short side SS2 and the long sides LS1 and LS2, and a plurality of second boundaries B2 corresponding to the round portions Rb to Rd.

The pixels PX are provided in matrix in the first direction X and the second direction Y. As described above, each pixel PX comprises the subpixels SP of a plurality of colors. The subpixels SP are arranged in the first direction X. The display area DA comprises a first round area R1 though which the second boundary B2a passes, a second round area R2 through which the second boundary B2a passes, and a first display area DA1. FIG. 7 exemplarily shows three first round areas R1a, R1b and R1c, and a single second round area R2a. The first round areas R1a, R1b and R1c and the second round area R2a extend in the first direction X.

Of the first area A1, none of the first round areas R1a, R1b and R1c and the second round area R2a is included in the first display area DA1. In the present embodiment, the boundary B includes the second boundary B2a and also includes the second boundary B2 other than the second boundary B2a. Thus, of the first area A1, neither the first round area R1 other than the first round areas R1a, R1b and R1c nor the second round area R2 other than the second round area R2a is included in the first display area DA1. In other words, the first display area DA1 does not include, of the first area A1, the area through which each second boundary B2 passes.

Of the display area DA, all the first round areas R1 and the second round areas R2 are referred to as a second display area DA2. Of the first display area DA1, the area through which the first boundary B1 passes and which extends in parallel with the first boundary B1 is referred to as a straight area R3. The first display area DA1 includes a straight area R3a through which the first boundary B1U passes and which extends in parallel with the first boundary B1U. In the present embodiment, the boundary B includes the first boundary B1U and also includes the first boundary B1 other than the first boundary B1U. Thus, the first display area DA1 includes the straight area R3a and also includes the straight area R3 other than the straight area R3a. In other words, the first display area DA1 includes the straight area R3 through which each first boundary B1 passes.

The display area DA is an area in which the pixels PX are located. The liquid crystal layer LC is at least located in the display area DA. The non-display area NDA is, of the second area A2, the area other than the first round area R1 and the second round area R2, and is the area shown by the diagonal lines in FIG. 7. The non-display area NDA is shielded from light by the light-shielding layer BM, etc.

The pixels PX include N or more pixels PX continuously arranged in the first direction X in the first round areas R1a, R1b and R1c, less than N pixels PX continuously arranged in the first direction X in the second round area R2a, and the pixels PX located in the first display area DA1. A plurality of pixels PX may not be located in the second round area R2, and thus, a single pixel PX may be provided in the second round area R2.

The pixels PX located in the first display area DA1 are a plurality of first pixels PX1. The pixels PX located in the first round areas R1a, R1b and R1c are a plurality of second pixels PX2. The pixels PX located in the second round area R2a include a third pixel PX3, and a fourth pixel PX4 in which the proportion of the area located on the second area A2 side is greater than that of the third pixel. In the figure, the number "1" is added to each first pixel PX1. The number "2" is added to each second pixel PX2. The number "3" is added to the third pixel PX3. The number "4" is added to the fourth pixel PX4.

The round portion Ra of the display area DA is equivalent to the boundary between the area shown by the numbers and the area shown by the diagonal lines in FIG. 7. Therefore, when the pixels PX are noted without paying attention to the light-shielding layer BM, the round portion Ra is not round strictly. It is difficult to match the round portion Ra of the display area DA with the second boundary B2a. In the present embodiment, the shape of the light-shielding layer BM in the first round areas R1a, R1b and R1c and the second round area R2a is adjusted such that the notches of the outline of the round portion Ra are inconspicuous.

Figure 8:
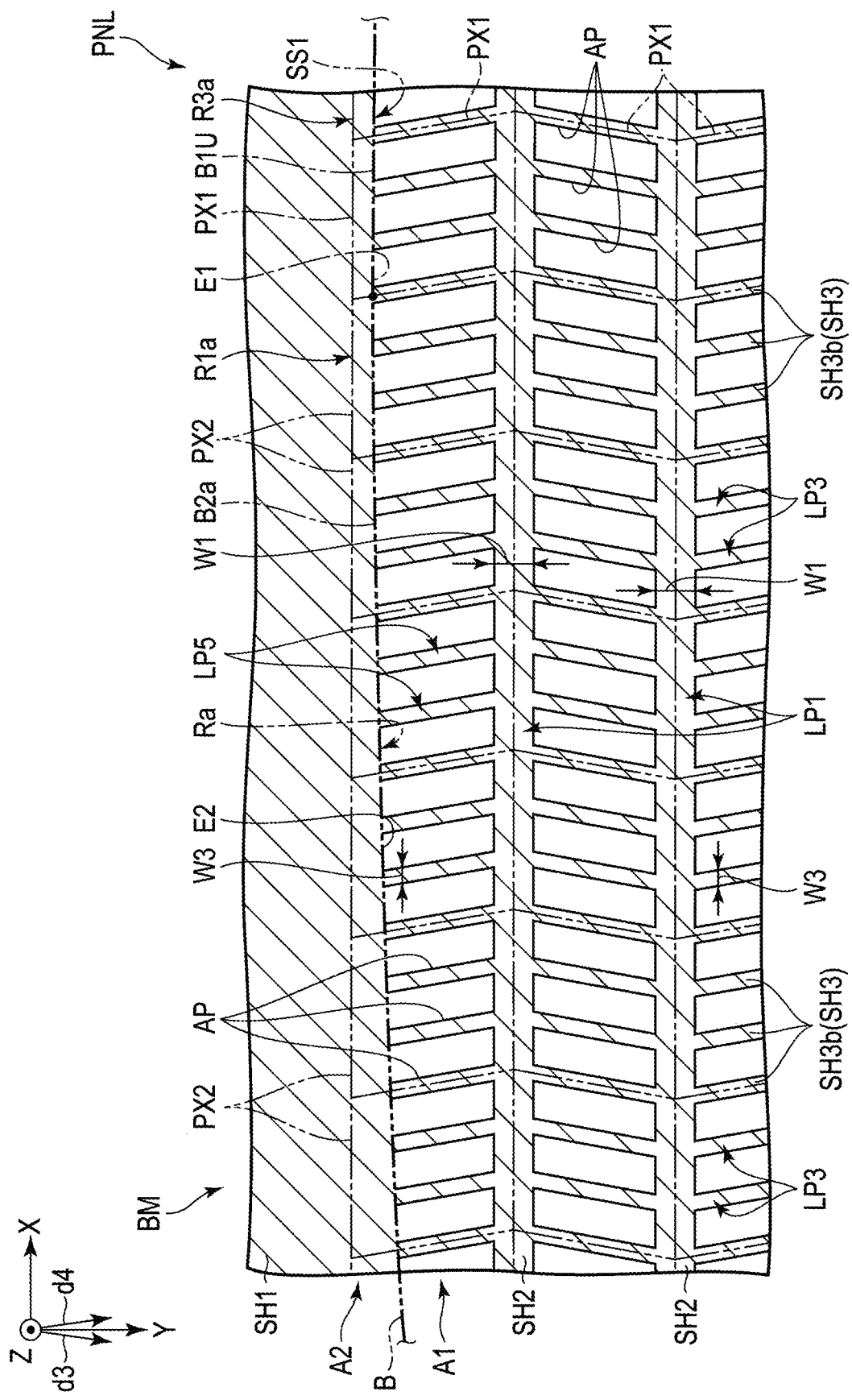
FIG. 8 is a plan view showing part of the area including the round portion and the short side shown in FIG. 7, and shows a light-shielding layer and a plurality of aperture regions.

Now, this specification explains the structure of the light-shielding layer BM. FIG. 8 is a plan view showing part of the round portion Ra and the short side SS1 of the display panel PNL, and shows the light-shielding layer BM and a plurality of aperture regions AP.

As shown in FIG. 8, the light-shielding layer BM is structured to adjust the light-transmissive area. The light-shielding layer BM comprises a first light-shielding portion SH1, a plurality of second light-shielding portions SH2, a plurality of third light-shielding portions SH3 and the aperture regions AP.

The first light-shielding portion SH1 is located in the second area A2. The second light-shielding portions SH2 and the third light-shielding portions SH3 are at least located in the first area A1, and intersect each other. The first light-shielding portion SH1, the second area A2 and the third light-shielding portions SH3 are integrally formed. The aperture regions AP are surrounded by the first light-shielding portion SH1, the second light-shielding portions SH2 and the third light-shielding portions SH3. The light-shielding layer BM defines the aperture regions AP. The light-shielding layer BM is structured to form the outlines of the aperture regions AP in the subpixels SP. In other words, the light-shielding layer BM is structured to adjust the area of the aperture regions AP.

The second light-shielding portions SH2 extend in the first direction X, are arranged at intervals in the second direction Y, and are arranged such that they alternate with the aperture regions AP in the second direction Y. The third light-shielding portions SH3 extend in the second direction Y, are arranged at intervals in the first direction X, and are arranged such that they alternate with the aperture regions AP in the first direction X.

In the present embodiment, each of the second light-shielding portions SH2 linearly extends in the first direction X. Each of the third light-shielding portions SH3 extends such that it is bent in a third direction d3 and a fourth direction d4. The third direction d3 is a direction different from the first direction X and the second direction Y. The fourth direction d4 is a direction different from the first direction X, the second direction Y and the third direction d3. In the present embodiment, in the figure, the third direction d3 is an obliquely downward left direction, and the fourth direction d4 is an obliquely downward right direction. When a pair of aperture regions AP adjacent to each other in the second direction Y is noted, one of the aperture regions AP extends in the third direction d3, and the other aperture region AP extends in the fourth direction d4. Each third light-shielding portion SH3 is bent in the boundary portions of the pixels PX arranged in the second direction Y.

In the present embodiment, each pixel PX comprises three subpixels SP. Thus, each pixel PX comprises three aperture regions AP. The three aperture regions AP are an aperture region AP which transmits the light of the first color, an aperture region AP which transmits the light of the second color, and an aperture region AP which transmits the light of the third color. In the present embodiment, the three aperture regions AP of each pixel PX have the same area. However, in a manner different from that of the present embodiment, the three aperture regions AP of each pixel PX may have different areas. Each aperture region AP may be referred to as an aperture. In the figure, the light-shielding layer BM is equivalent to the area shown by the diagonal lines. Each aperture region AP is equivalent to an area without the diagonal lines. Each pixel PX is defined by two-dot chain lines.

Figure 9:
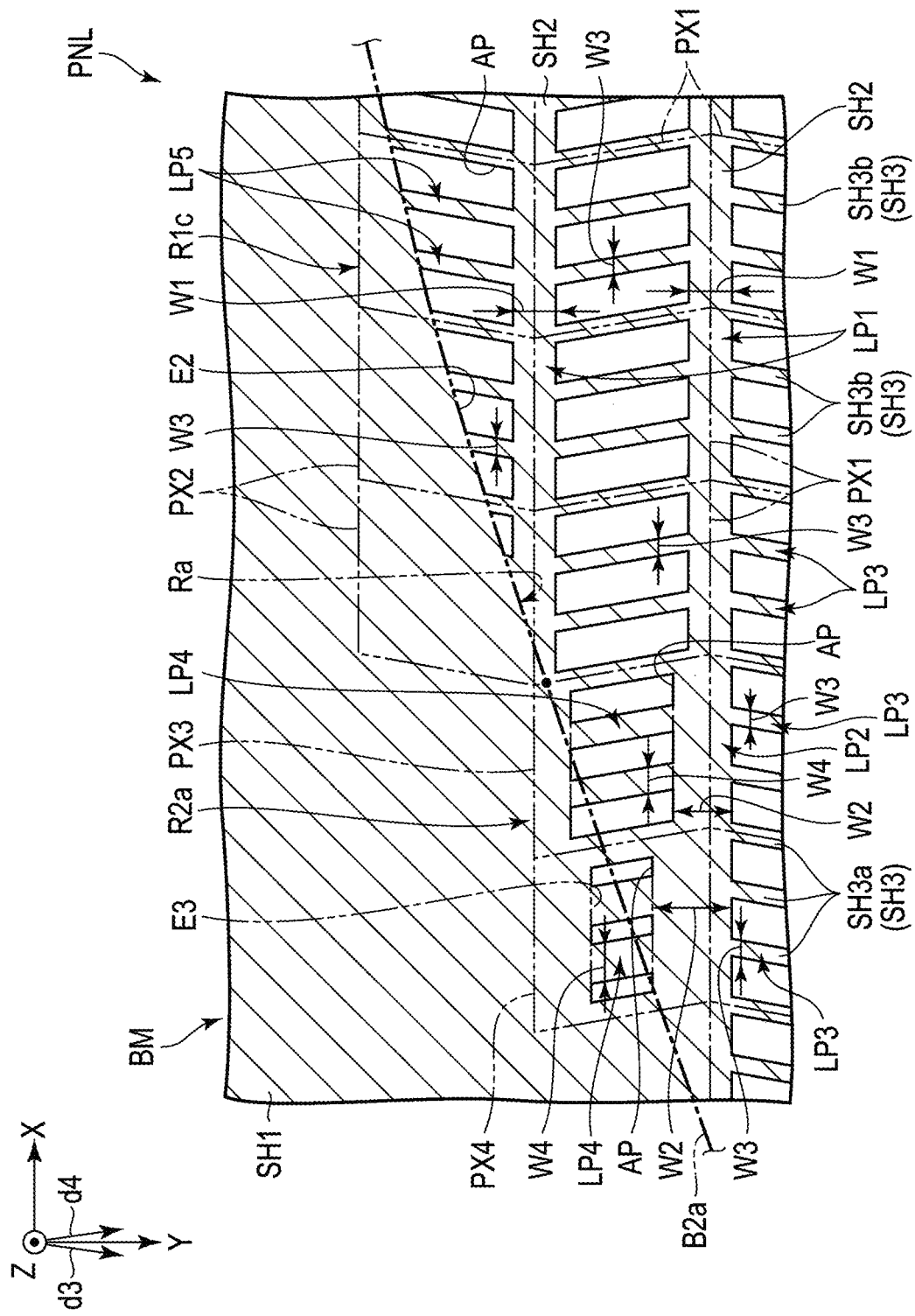
FIG. 9 is a plan view showing part of the area including the round portion shown in FIG. 7, and shows the light-shielding layer and a plurality of aperture regions.

FIG. 9 is a plan view showing part of the area including the round portion Ra of the display panel PNL, and shows the light-shielding layer BM and a plurality of aperture regions AP.

As shown in FIG. 8 and FIG. 9, the end portion of the first light-shielding portion SH1 on the first area A1 side comprises a linear first end portion E1, a curved second end portion E2 and a stepwise third end portion E3. The second end portion E2 is located between the first end portion E1 and the third end portion E3. The first end portion E1, the second end portion E2 and the third end portion E3 are continuously arranged.

As shown in FIG. 8, the first end portion E1 is located on the first boundary B1U in the straight area R3a. The first pixels PX1 located in the straight area R3a are aligned in the first direction X. The upper sides of the aperture regions AP of these first pixels PX1 are located on the first boundary B1U. By matching the upper side (short side SS1) of the display area DA with the first boundary B1U, the upper side of the display area DA can be made ideal. The first pixels PX1 located in the straight area R3a are provided along the short side SS11, comprise first aperture regions (aperture regions AP) and form a first pixel group. The light-shielding layer BM (first light-shielding portion SH1) includes a first linear portion formed along the short side SS11 side of the aperture regions AP of the first pixels PX1 located in the straight area R3a. Each first pixel PX1 of the first pixel group comprises at least three subpixels SP. The first aperture regions corresponding to the three subpixels SP, respectively, are substantially the same in the three subpixels.

When a row including the first round area R1a and extending in the first direction X is noted, the second pixels PX2 and the first pixels PX1 are arranged in order in the first direction X.

As shown in FIG. 8 and FIG. 9, the second end portion E2 is located on the second boundary B2a in the first round areas R1a and R1c. Although not shown in the figure, the second end portion E2 is also located on the second boundary B2a in the first round area R1b. In the first round areas R1a, R1b and R1c, the light-shielding layer BM completely covers the portion which belongs to the second area A2. Since the round portion Ra can be matched with the second boundary B2a in the first round areas R1a, R1b and R1c, the round portion Ra can be made round.

The second pixels PX2 located in the first round areas R1a and R1c are provided along the round portion Ra, comprise second aperture regions (aperture regions AP) and form a second pixel group. The light-shielding layer BM (first light-shielding portion SH1) includes a curved portion formed along the round portion Ra of the aperture regions AP of the second pixels PX2 located in the first round areas R1a and R1c. Each second pixel PX2 of the second pixel group comprises at least three subpixels SP. The second aperture regions corresponding to the three subpixels SP, respectively, are different from each other in the three subpixels SP.

As shown in FIG. 9, the third end portion E3 extends so as to be bent in the first direction X and the second direction Y in the second round area R2a. The total area of the aperture region AP of the fourth pixel PX4 is less than the total area of the aperture region AP of the third pixel PX3. As described above, the area of the aperture regions of the pixels PX of the second round area R2a is adjusted, thereby optically blurring the outline of the round portion Ra of the display area DA. In other words, the notches of the outline of the round portion Ra of the display area DA can be made inconspicuous.

The third pixel PX3 and the fourth pixel PX4 located in the second round area R2a are provided along the round portion Ra, comprise third aperture regions (aperture regions AP) and form a third pixel group. The pixels located in the second round area R2a may be collectively called the third pixels. The light-shielding layer BM (first light-shielding portion SH1) includes a second linear portion formed along the short side SS11 side of the third aperture regions AP.

The light-shielding layer BM (first light-shielding portion SH1) further comprises a third linear portion on the long side LS11 side of the third aperture regions. The first linear portion is connected to the curved portion. The curved portion is connected to the second linear portion. The second linear portion is connected to the third linear portion. Each pixel (third pixel) of the third pixel group comprises at least three subpixels SP. The third aperture regions corresponding to the three subpixels SP, respectively, are substantially the same in the three subpixels SP.

When a row including the second round area R2a and extending in the first direction X is noted, the fourth pixel PX4, the third pixel PX3 and the first pixels PX1 are arranged in order in the first direction X.

In the first direction X, the width of the first round area R1 is greater than the width of the second round area R2. Thus, the shape of the second end portion E2 should not be preferably stepwise. If the shape of the second end portion E2 is stepwise, the notches of the outline of the round portion Ra of the display area DA are conspicuous.

Now, this specification explains the value of N.

As described above, in the first round area R1, N or more second pixels PX2 are continuously arranged in the first direction X. In the second round area R2a, a single PX is provided, or less than N pixels PX are continuously arranged in the first direction X.

In the present embodiment, N is equal to four. However, N may be three or a natural number greater than or equal to five.

It should be noted that the notches of the outline of the round portion Ra (second round area R2) are more conspicuous with increasing N. Thus, N should be preferably less than or equal to six such that the notches of the outline of the round portion Ra are inconspicuous.

The color balance of the second pixels PX2 of the first round area R1 is more easily lost with decreasing N since the curvature of the second boundary B2a passing through the first round area R1 is increased. To maintain the color balance of the second pixels PX2 of the first round area R1, N should be preferably greater than or equal to four.

Now, this specification explains the size of each aperture region AP and the shape of the light-shielding layer BM.

As shown in FIG. 7 to FIG. 9, each first pixel PX1 is a regular pixel. The area of the aperture region AP of each first pixel PX1 is a regular area. The total area of the aperture regions AP of each of the pixels PX located in the second display area DA2 is less than the total area of the aperture regions AP of each of the pixels PX located in the first display area DA1.

When the aperture regions AP which transmit the light of the same color are compared with each other, the area of each aperture region AP located in the second round area R2a is less than the area of each aperture region AP located in the first display area DA1.

The second light-shielding portion SH2 includes a first linear portion LP1 and a second linear portion LP2.

The first linear portion LP1 forms the outlines of the aperture regions AP located in the first display area DA1 and the first round areas R1a, R1b and R1c and has a first width W1 in the second direction Y.

The second linear portion LP2 adjusts the outlines of the aperture regions AP located in the second round area R2a and has a second width W2 in the second direction Y. The second width W2 is greater than the first width W1.

Thus, in the present embodiment, in the second direction Y, each aperture region AP located in the second round area R2a is shorter than each aperture region AP located in the first display area DA1.

The first width W1 of the first linear portion LP1 is constant. The second width W2 of the second linear portion LP2 is increased in stages with distance from the first linear portion LP1 in the first direction X. In the second linear portion LP2, the second width W2 of the portion adjusting the outline of the aperture region AP of the fourth pixel PX4 is greater than the second width W2 of the portion adjusting the outline of the aperture region AP of the third pixel PX3.

The third light-shielding portions SH3 comprise a plurality of third light-shielding portions SH3a belonging to a first group and a plurality of third light-shielding portions SH3b belonging to a second group.

Each third light-shielding portion SH3a includes a third linear portion LP3 and a fourth linear portion LP4. The third linear portions LP3 form the outlines of the aperture regions AP located in the first display area DA1. Each third linear portion LP3 has a third width W3 in the first direction X. The fourth linear portions LP4 adjust the outlines of the aperture regions AP located in the second round area R2a. Each fourth linear portion LP4 has a width W4 in the first direction X. The fourth width W4 is greater than the third width W3.

Each third light-shielding portion SH3b includes the third linear portion LP3 and a fifth linear portion LP5. The fifth linear portions LP5 form the outlines of the aperture regions AP located in the first round areas R1a, R1b and R1c. Each fifth linear portion LP5 has the third width W3 in the first direction X.

Thus, in the present embodiment, in the first direction X, each aperture region AP located in the second round area R2a is shorter than each aperture region AP located in the first display area DA1.

The third width W3 of each third light-shielding portion SH3a and each third light-shielding portion SH3b is constant. When the fourth linear portions LP4 and the third linear portion LP3 arranged in the first direction X are noted, the fourth width W4 is increased in stages with distance from the third linear portions LP3 in the first direction X. The fourth width W4 of each fourth linear portion LP4 adjusting the outline of each aperture region AP of the fourth pixel PX4 is greater than the fourth width W4 of each fourth linear portion LP4 adjusting the outline of each aperture region AP of the third pixel PX3.

Now, this specification explains another method for distinguishing the first round area R1 from the second round area R2. As stated above, when the pixels PX are used, the first round area R1 can be distinguished from the second round area R2 based on the number of pixels PX continuously arranged in the first direction X in the area through which the second boundary B2 passes. However, the first round area R1 can be distinguished from the second round area R2 without using the pixels PX. FIG. 10 is a plan view showing the area including the round portion Ra and the short side SS1 shown in FIG. 7, and is shown for explaining a method for distinguishing the first round areas R1a, R1b and R1c from the second round area R2a.

As shown in FIG. 10, the second boundary B2a passes through all of the first round areas R1a, R1b and R1c and the second round area R2a. Here, the tangent to the second boundary B2a is defined as a tangent TA. The extension of the first boundary B1U is defined as an extension ES. Of the area through which the second boundary B2a passes, the area in which angle θ between the tangent TA and the extension ES is less than a reference value can be classified as the first round area R1. Of the area through which the second boundary B2a passes, the area in which angle θ is greater than or equal to the reference value can be classified as the second round area R2. For example, the first round area R1a is the area in which angle θ1a is less than the reference value, and the second round area R2a is the area in which angle θ2a is greater than or equal to the reference value.

Figure 11:
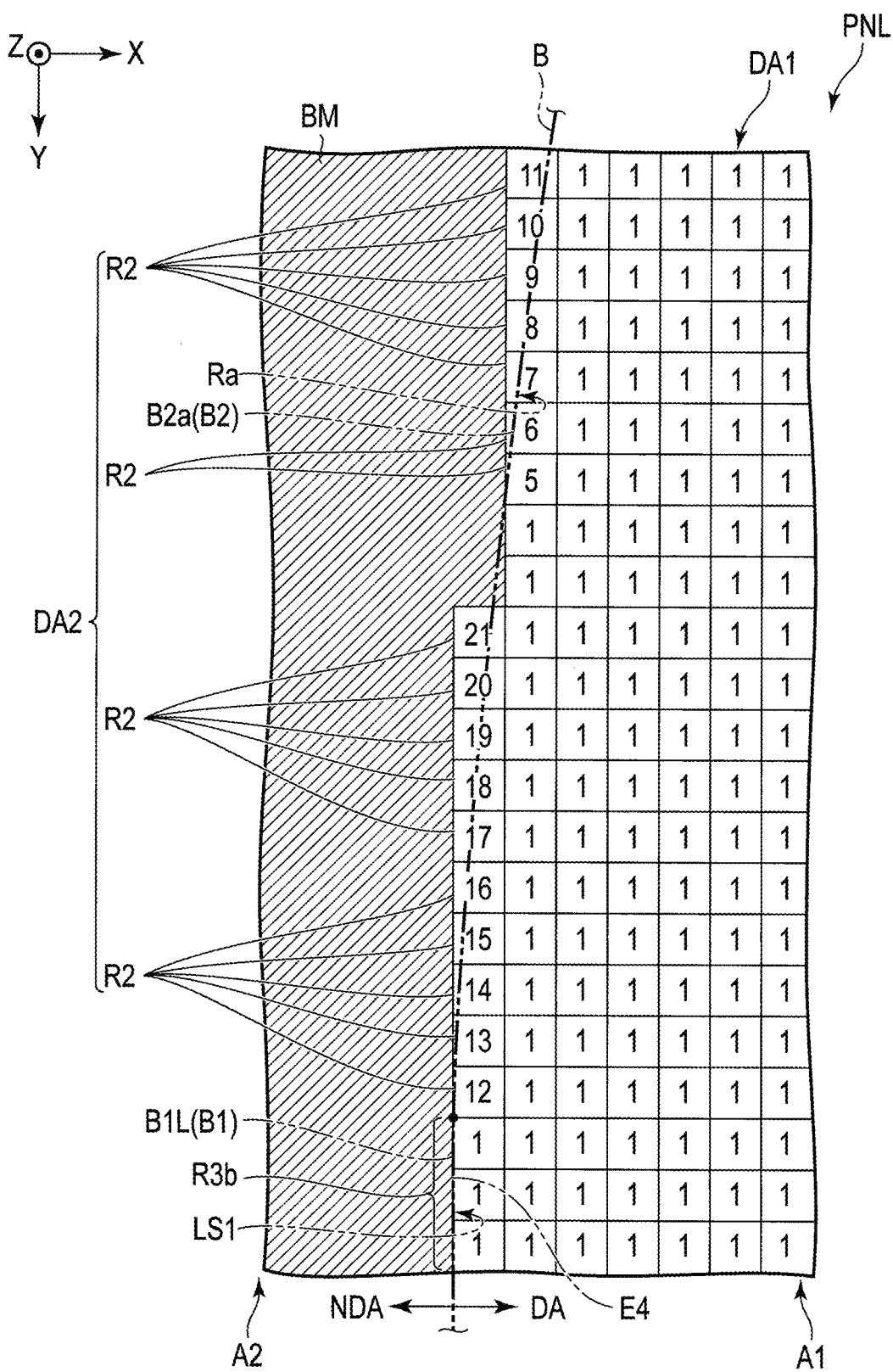
FIG. 11 is a plan view showing an area including a round portion and a long side of the display area of the display panel, and is shown for explaining the relationship between an ideal display area and a plurality of pixels.

FIG. 11 is a plan view showing an area including the round portion Ra and the long side LS1 of the display area DA of the display panel PNL, and is shown for explaining the relationship between an ideal display area and a plurality of pixels PX.

As shown in FIG. 11, the boundary B comprises the curved second boundary B2a, and a linear first boundary B1L located on the left side of the first area A1, connected to the second boundary B2a and parallel to the second direction Y.

The display area DA comprises the first display area DA1 and the second display area DA2. The first display area DA1 includes a straight area R3b through which the first boundary B1L passes and which extends in parallel with the first boundary B1L. The second display area DA2 includes the second round areas R2. As the second round areas R2, FIG. 11 exemplarily shows 17 second round areas R2.

The pixels PX include the first pixels PX1 located in the first display area DA1, and the pixels PX located in the second display area DA2. A single pixel PX is located in each second round area R2 shown in FIG. 11.

The pixels PX located in the second round areas R2 include a fifth pixel PX5, a sixth pixel PX6 in which the proportion of the area located on the second area A2 is greater than that of the fifth pixel, a seventh pixel PX7 in which the proportion of the area located on the second area A2 is greater than that of the sixth pixel, an eighth pixel PX8 in which the proportion of the area located on the second area A2 is greater than that of the seventh pixel, a ninth pixel PX9 in which the proportion of the area located on the second area A2 is greater than that of the eighth pixel, a 10th pixel PX10 in which the proportion of the area located on the second area A2 is greater than that of the ninth pixel, and an 11th pixel PX11 in which the proportion of the area located on the second area A2 is greater than that of the 10th pixel.

The pixels PX located in the second round areas R2 further include a 12th pixel PX12, a 13th pixel PX13 in which the proportion of the area located on the second area A2 is greater than that of the 12th pixel, a 14th pixel PX14 in which the proportion of the area located on the second area A2 is greater than that of the 13th pixel, a 15th pixel PX15 in which the proportion of the area located on the second area A2 is greater than that of the 14th pixel, a 16th pixel PX16 in which the proportion of the area located on the second area A2 is greater than that of the 15th pixel, a 17th pixel PX17 in which the proportion of the area located on the second area A2 is greater than that of the 16th pixel, an 18th pixel PX18 in which the proportion of the area located on the second area A2 is greater than that of the 17th pixel, a 19th pixel PX19 in which the proportion of the area located on the second area A2 is greater than that of the 18th pixel, a 20th pixel PX20 in which the proportion of the area located on the second area A2 is greater than that of the 19th pixel, and a 21st pixel PX21 in which the proportion of the area located on the second area A2 is greater than that of the 20th pixel.

In the figure, the numbers "5" to "21" are added to the fifth pixel PX5 to the 21st pixel PX21, respectively. In the present embodiment, the shape of the light-shielding layer BM in the second round areas R2 shown in FIG. 11 is also adjusted to make the notches of the outline of the round portion Ra inconspicuous.

Figure 12:
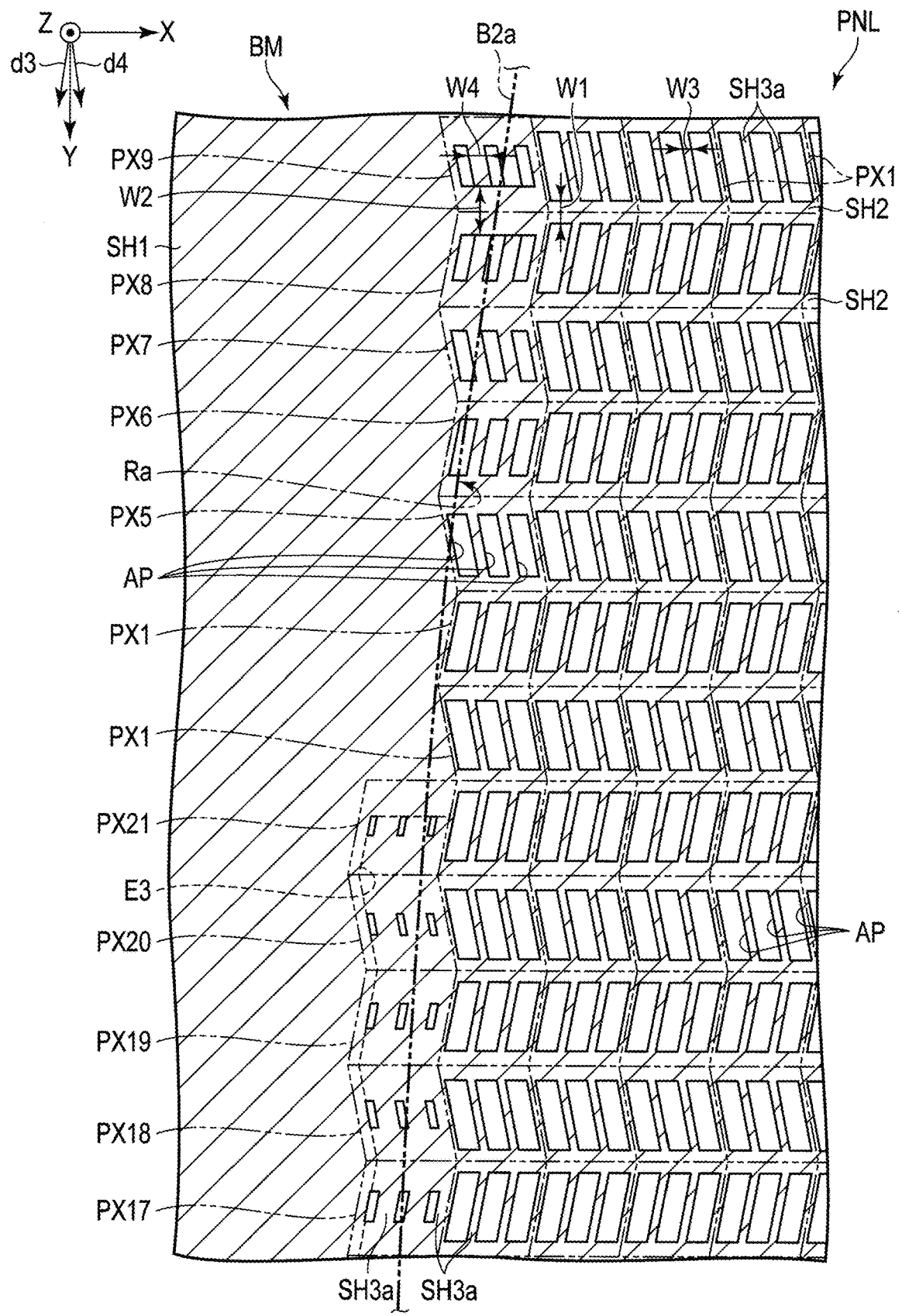
FIG. 12 is a plan view showing part of the area including the round portion shown in FIG. 11, and shows the light-shielding layer and a plurality of aperture regions.

Now, this specification explains the structure of the light-shielding layer BM. FIG. 12 is a plan view showing part of the area including the round portion Ra of the display panel PNL shown in FIG. 11, and shows the light-shielding layer BM and a plurality of aperture regions AP.

As shown in FIG. 11 and FIG. 12, the end portion of the first light-shielding portion SH1 on the first area A1 side comprises the third end portion E3 and a linear fourth end portion E4. The third end portion E3 and the fourth end portion E4 are continuously arranged.

As shown in FIG. 11 and FIG. 12, when the fifth pixel PX5 to the 11th pixel PX11 arranged in the second direction Y are noted, the total area of the aperture regions AP of the fifth pixel PX5 is the greatest, and the total area of the aperture regions AP of the 11th pixel PX11 is the least. The total area of the aperture regions AP of each pixel PX is gradually decreased from the fifth pixel PX5 to the 11th pixel PX11. When the 12th pixel PX12 to the 21st pixel PX21 arranged in the second direction Y are noted, the total area of the aperture regions AP of the 12th pixel PX12 is the greatest, and the total area of the aperture regions AP of the 21st pixel PX21 is the least. The total area of the aperture regions AP of each pixel PX is gradually decreased from the 12th pixel PX12 to the 21st pixel PX21.

As described above, the areas of the aperture regions AP of the pixels PX of the second round areas R2 arranged in the second direction Y in the light-shielding layer BM are adjusted. In this way, the outline of the round portion Ra of the display area DA can be optically blurred.

As shown in FIG. 11, the fourth end portion E4 is located on the first boundary B1L in the straight area R3b. The first pixels PX1 located in the straight area R3b are aligned in the second direction Y. The left sides of the aperture regions AP of the left ends of these first pixels PX1 are located on the first boundary B1L. Thus, when the left side (long side LS1) of the display area DA is matched with the first boundary B1L, the left side of the display area DA can be made ideal.

As described above, in the present embodiment, the third pixel PX3 to the 21st pixel PX21 are shown as the examples of the pixels PX of the second round areas R2 (FIG. 7 and FIG. 11). However, the pixels PX of the second round areas R2 are not limited to the third pixel PX3 to the 21st pixel PX21, and may be changed in various ways. In the second round areas R2, a single pixel PX or a plurality of types of pixels PX in which the total area of the aperture regions AP differs depending on the pixel PX should be located. However, the total area of the aperture regions AP of the pixel PX located in each second round area R2 is less than the total area of the aperture regions AP of each first pixel PX1.

For example, 255 types of pixels PX in which the total area of the aperture regions differs depending on the pixel PX may be selectively provided in the second round areas R2. Alternatively, as another example, five types of pixels PX in which the total area of the aperture regions differs depending on the pixel PX may be selectively provided in the second round areas R2. At this time, the shape of the light-shielding layer BM should be adjusted such that the total area of the aperture regions of each pixel PX is decreased as the proportion of the area located on the second area A2 side is increased.

When the number of types of pixels PX provided in the second round areas R2 is less, for example, five, the light-shielding layer BM may adjust both the width of each aperture region AP in the first direction X and the width of each aperture region AP in the second direction Y. However, in a manner different from that of the above embodiment, only the width of each aperture region AP in the first direction X may be adjusted. Alternatively, only the width of each aperture region AP in the second direction Y may be adjusted. In other words, the second light-shielding portions SH2 may be formed such that the second width W2 is greater than the first width W1, and the third light-shielding portions SH3 may be formed such that the fourth width W4 is equal to the third width W3. Alternatively, the second light-shielding portions SH2 may be formed such that the second width W2 is equal to the first width W1, and the third light-shielding portions SH3 may be formed such that the fourth width W4 is greater than the third width W3.

FIG. 13 is a plan view showing an array of pixels PX in the display panel PNL.

As shown in FIG. 13, in the present embodiment, the pixels PX are categorized into two types of main pixels MPX1 and MPX2. Two main pixels MPX1 and MPX2 adjacent to each other in the second direction Y constitute a unit pixel UPX. Each of the main pixels MPX1 and MPX2 is equivalent to a minimum unit for displaying a color image. Each main pixel MPX1 includes a subpixel SP1a, a subpixel SP2a and a subpixel SP3a. Each main pixel MPX2 includes a subpixel SP1b, a subpixel SP2b and a subpixel SP3b. The shape of each subpixel SP is substantially a parallelogram as shown in the figure.

Each of the main pixels MPX1 and MPX2 includes the subpixels SP of a plurality of colors arranged in the first direction X. Each of the subpixels SP1a and SP1b is the subpixel of the first color and comprises a first color layer CF1. Each of the subpixels SP2a and SP2b is the subpixel of the second color different from the first color and comprises a second color layer CF2. Each of the subpixels SP3a and SP3b is the subpixel of the third color different from the first color and the second color and comprises a third color layer CF3.

The color filter CF is located in the aperture regions AP. The first color layer CF1, the second color layer CF2 or the third color layer CF3 is located in each aperture region AP. Specifically, the first color layer CF1 is located in the aperture region AP of each of the subpixels SP1a and SP1b. The second color layer CF2 is located in the aperture region AP of each of the subpixels SP2a and SP2b. The third color layer CF3 is located in the aperture region AP of each of the subpixels SP3a and SP3b.

The main pixels MPX1 are repeatedly disposed in the first direction X. Similarly, the main pixels MPX2 are repeatedly disposed in the first direction X. A row of the main pixels MPX1 arranged in the first direction X and a row of the main pixels MPX2 arranged in the first direction X are alternately and repeatedly disposed in the second direction Y.

The first color layer CF1, the second color layer CF2 and the third color layer CF3 are arranged in accordance with the above layout of the subpixels SP, and have areas corresponding to the sizes of the subpixels SP, respectively. In the present embodiment, each of the first color layer CF1, the second color layer CF2 and the third color layer CF3 is formed into a stripe shape, and extends in the second direction Y such that it is bent. They are arranged in order in the first direction X.

When the shape of each subpixel SP is substantially a parallelogram as shown in the figure, a plurality of domains in which the rotational direction of the director differs depending on the domain may be set in the unit pixels UPX. By combining two main pixels MPX1 and MPX2, a large number of domains can be formed with respect to the subpixels of various colors. Thus, the property of viewing angle can be compensated. When the property of viewing angle is noted, a single unit pixel UPX formed of a combination of main pixels MPX1 and MPX2 is equivalent to a minimum unit for displaying a color image.

Figure 14:
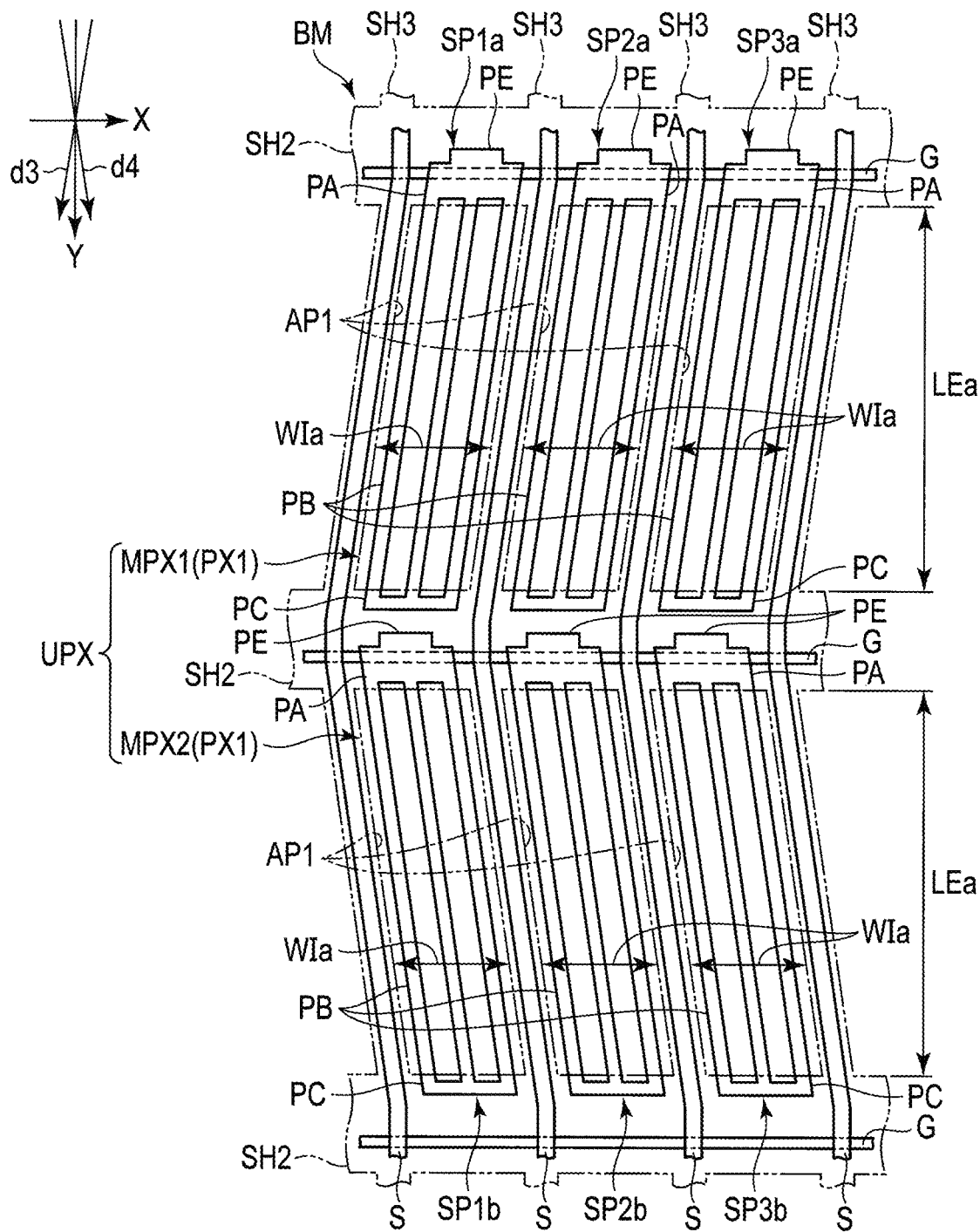
FIG. 14 is a plan view showing a unit pixel of the display panel, and shows scanning lines, signal lines, pixel electrodes and the light-shielding layer.

FIG. 14 is a plan view showing a unit pixel UPX of the display panel PNL, and shows scanning lines G, signal lines S, pixel electrodes PE and the light-shielding layer BM. FIG. 14 shows only the structures necessary for explanation. For example, the color filter CF and the common electrode CE are omitted. The pixels PX shown in FIG. 14 are the first pixels PX1. In the example shown in the figure, the pixels PX such as the first pixels PX1 have a structure corresponding to the above FFS mode. The scanning lines G and the signal lines S are provided in the first substrate SUB1 while the light-shielding layer BM is provided in the second substrate SUB2. The light-shielding layer BM is shown by two-dot chain lines in the figure.

As shown in FIG. 14, the light-shielding layer BM comprises a function for at least blocking the light emitted from the backlight unit BL. The light-shielding layer BM is formed of a material in which the light absorption index is high, such as black resin. However, in a manner different from that of the present embodiment, the light-shielding layer BM may be formed of a material in which the light reflectance is high, such as metal.

Each scanning line G extends in the first direction X. Specifically, each scanning line G faces a corresponding second light-shielding portion SH2 and extends along the corresponding second light-shielding portion SH2. Each second light-shielding portion SH2 faces a corresponding scanning line G, an end portion of each pixel electrode PE (the contact portion PA or the other end portion PC), the above switching element SW, etc. Each signal line S extends in the second direction Y such that it is bent. Specifically, each signal line S faces a corresponding third light-shielding portion SH3 and extends along the corresponding third light-shielding portion SH3.

The aperture regions AP, the main electrode portions PB and the slits PSL of the main pixel MPX1 extend in the third direction d3. The aperture regions AP, the main electrode portions PB and the slit PSL of the main pixel PX2 extend in the fourth direction d4. Between two adjacent scanning lines G, each main electrode portion PB has a shape along the signal lines S. The signal lines S and the pixel electrodes PE (main electrode portions PB) extend in parallel with each other. When voltage is applied to the liquid crystal layer LC, the rotational state (alignment state) of liquid crystal molecules LM in the aperture regions AP of the main pixel MPX1 is different from the rotational state (alignment state) of liquid crystal molecules LM in the aperture regions AP of the main pixel MPX2.

In the subpixels SP1, SP2 and SP3 of each first pixel PX1, the aperture regions AP are located in the center portions of the subpixels, respectively. The aperture regions AP of the subpixels SP1, SP2 and SP3 of each first pixel PX1 have the same length LEa in the second direction Y and the same width WIa in the first direction X. In all the first pixels PX1, the aperture regions AP have the same length LEa and the same width WIa.

As described above, in the present embodiment, the pixel electrodes PE are closer to the liquid crystal layer LC than the common electrode CE. Here, the pixel electrodes PE are top electrodes, and the common electrode CE is a bottom electrode.

In the present embodiment, in all the subpixels SP1, SP2 and SP3 of each first pixel PX1, the main electrode portion PB of the pixel electrode PE is located in the first aperture region AP1.

In the entire area of the first substrate SUB1, the scanning lines G are arranged with the same pitch. In the entire area of the first substrate SUB1, the signal lines S are arranged with the same pitch. In the entire area of the first substrate SUB1, the pixel electrodes PE are arranged with the same pitch, and have the same shape and size.

In the example of the unit pixel UPX shown in FIG. 14, the main pixel MPX1 is located on the upper side of the figure, and the main pixel MPX2 is located on the lower side of the figure. However, in a manner different from that of the present embodiment, in the unit pixel UPX, the main pixel MPX1 may be located on the lower side of the figure, and the main pixel MPX2 may be located on the upper side of the figure.

In the above description, this specification exemplarily explains the main pixels MPX1 and MPX2 which are the first pixels PX1 with reference to FIG. 14. Now, this specification explains the third pixel PX3 with reference to FIG. 15. FIG. 15 is a plan view showing the third pixel PX3 of the display panel PNL, and shows scanning lines G, signal lines S, pixel electrodes PE and the light-shielding layer BM. Here, the figure shows only the main portions necessary for explanation and shows a case where the third pixel PX3 is the main pixel MPX2. This specification mainly explains the relationship between the third pixel PX3 and the first pixels PX1 and the difference between the third pixel PX3 and the first pixels PX1.

As shown in FIG. 15, the aperture regions AP of the subpixels SP1, SP2 and SP3 of the third pixel PX3 have the same length LEb in the second direction Y and the same width WIb in the first direction X. The length LEb is less than the length LEa of each first pixel PX1. The width WIb is less than the width WIa of each first pixel PX1.

Now, this specification explains the fourth pixels PX4 with reference to FIG. 16. FIG. 16 is a plan view showing the fourth pixel PX4 of the display panel PNL, and shows scanning lines G, signal lines S, pixel electrodes PE and the light-shielding layer BM. Here, the figure shows only the main portions necessary for explanation and shows a case where the fourth pixel PX4 is the main pixel MPX2. This specification mainly explains the relationship between the fourth pixel PX4 and the third pixel PX3 and the difference between the fourth pixel PX4 and the third pixel PX3.

As shown in FIG. 16, the aperture regions AP of the subpixels SP1, SP2 and SP3 of the fourth pixel PX4 have the same length LEc in the second direction Y and the same width WIc in the first direction X. The length LEc is less than the length LEb of the third pixel PX3. The width WIc is less than the width WIb of the third pixel PX3.

According to the display device DSP of the embodiment having the above structures, the boundary B between the first area A1 and the second area A2 has a frame shape. The display device DSP comprises the light-shielding layer BM comprising the first light-shielding portion SH1. The end portion E of the first light-shielding portion SH1 on the first area A1 side comprises the linear first end portion E1, the curved second end portion E2 and the stepwise third end portion E3. Compared to a case where the second end portion E2 has a stepwise shape instead of a curved shape, the notches of the outline of the round portions Ra, Rb, Rc and Rd of the display area DA can be made inconspicuous.

Because of the above structures, it is possible to obtain a display device DSP with excellent display quality.

Modification Example 1 of Embodiment

Figure 17:
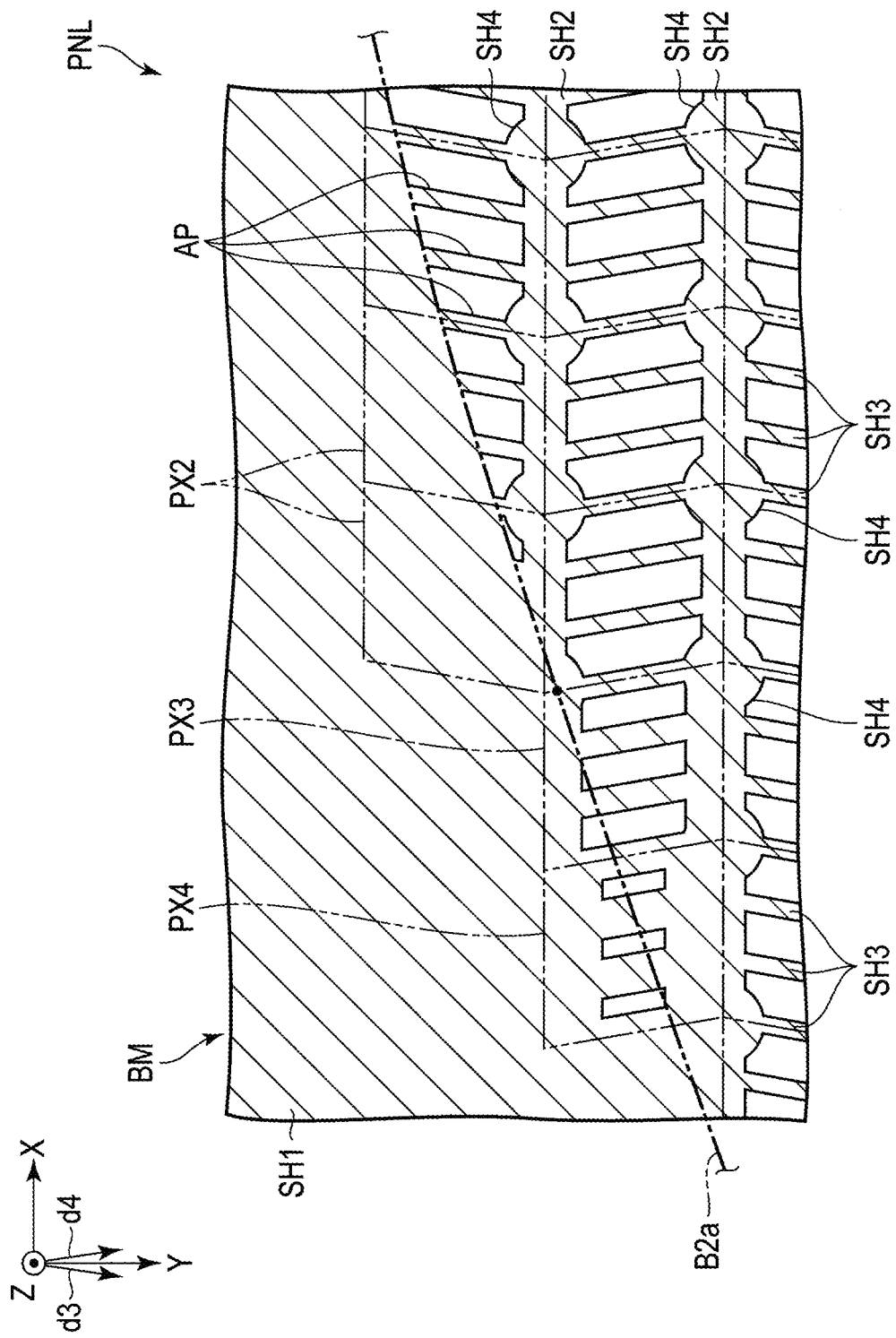
FIG. 17 is a plan view showing an area including the round portion of the display area of the display panel of the display device of modification example 1 of the embodiment, and shows the light-shielding layer and a plurality of aperture regions.

Now, this specification explains the display device DSP of modification example 1 of the above embodiment. FIG. 17 is a plan view showing an area including the round portion Ra of the display area DA of the display panel PNL of the display device DSP of modification example 1 of the embodiment, and shows the light-shielding layer BM and the aperture regions AP.

As shown in FIG. 17, the light-shielding layer BM may further comprise fourth light-shielding portions SH4. The fourth light-shielding portions SH4 are located at the intersections of the second light-shielding portions SH2 and the third light-shielding portions SH3, and are formed integrally with the second light-shielding portions SH2 and the third light-shielding portions SH3. In the X-Y plane, the intersections of the second light-shielding portions SH2 and the third light-shielding portions SH3 are added as the fourth light-shielding portions SH4.

In the present embodiment, two third light-shielding portions SH3 are interposed between two fourth light-shielding portions SH4 arranged in the first direction X. The two fourth light-shielding portions SH4 arranged in the first direction X are spaced apart from each other. Each fourth light-shielding portion SH4 is located in the center of four adjacent pixels PX. Each fourth light-shielding portion SH4 is a perfect circle. However, each fourth light-shielding portion SH4 may be a circle other than a perfect circle such as an ellipse, or may be a polygon such as a quadrangle.

A spacer is provided in the area of each fourth light-shielding portion SH4. The spacer comprises a function for holding a gap between the first substrate SUB1 and the second substrate SUB2. For example, when the spacer is a columnar spacer formed using photolithography, the spacer is provided in one of the first substrate SUB1 and the second substrate SUB2. When the spacer is a main spacer, the main spacer is in contact with the other one of the first substrate SUB1 and the second substrate SUB2. A sub-spacer is not in contact with the other substrate.

In modification example 1, an effect similar to that of the above embodiment can be obtained.

Modification Example 2 of Embodiment

Now, this specification explains the display device DSP of modification example 2 of the above embodiment. FIG. 18 is a plan view showing a structural example of the pixel electrode PE and the common electrode CE provided in a pixel PX of the display device DSP of modification example 2 of the above embodiment.

As shown in FIG. 18, the common electrode CE may be located above the pixel electrode PE, and may be closer to the liquid crystal layer LC than the pixel electrode PE. The pixel electrode PE is formed into a plate shape, does not have a slit and is provided between two adjacent signal lines S. The common electrode CE overlaps the signal lines S and the pixel electrode PE. The common electrode CE comprises slits CSL immediately above the pixel electrode PE.

In the example shown in the figure, the common electrode CE comprises two slits CSL extending in parallel with the signal lines S at a position facing the pixel electrode PE. The two slits CSL are arranged across an intervening space in the first direction X, and have substantially the same width in the first direction X. The shape of the pixel electrode PE is not limited to the example shown in the figure, and may be arbitrarily changed in accordance with the shape of the pixel PX, etc. The shape or the number of slits CSL is not limited to the example shown in the figure.

In modification example 2, an effect similar to that of the above embodiment can be obtained.

Modification Example 3 of Embodiment

Figure 19:
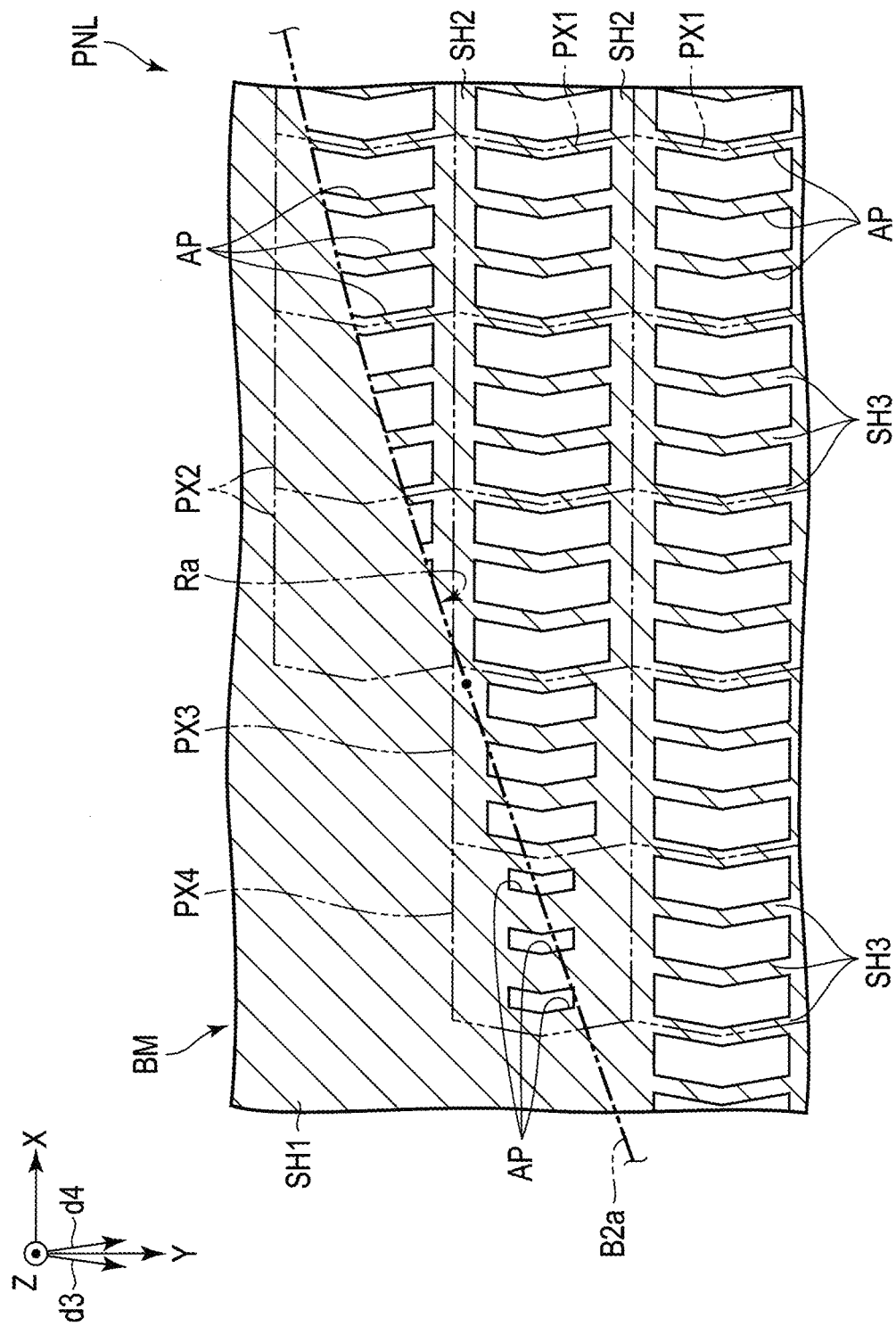
FIG. 19 is a plan view showing an area including the round portion of the display area of the display panel of the display device of modification example 3 of the embodiment, and shows the light-shielding layer and a plurality of aperture regions.

Now, this specification explains the display device DSP of modification example 3 of the above embodiment. In the above first embodiment, each aperture region AP and each pixel electrode PE are substantially shaped like a parallelogram, and compensate the property of viewing angle by a single unit pixel UPX. However, in modification example 3, the shape of each pixel PX is different from that of the embodiment, etc. Thus, the property of viewing angle is compensated by a single pixel PX. FIG. 19 is a plan view showing an area including the round portion Ra of the display area DA of the display panel PNL of the display device DSP of modification example 3 of the embodiment, and shows the light-shielding layer BM and the aperture regions AP.

As shown in FIG. 19, in modification example 3, in each first pixel PX1, the third pixel PX3 and the fourth pixel PX4, each aperture region AP has the shape of the symbol "<". In each second pixel PX2, each aperture region AP has the shape of part of the symbol "<". Each third light-shielding portion SH3 extends in the third direction d3 and the fourth direction d4. Each third light-shielding portion SH3 is bent in the boundary portions of the pixels PX arranged in the second direction Y and is further bent in the center portions of the pixels PX in the second direction Y.

FIG. 20 is a plan view showing each first pixel PX1 shown in FIG. 19, and shows scanning lines G, signal lines S, pixel electrodes PE and the light-shielding layer BM.

As shown in FIG. 20, each second light-shielding layer SH2 faces a corresponding scanning line G, the end portions of the pixel electrodes PE, the switching element SW, etc., and extends along the scanning lines G in the first direction X. Each third light-shielding layer SH3 faces a corresponding signal line S and extends along the signal lines S.

Each aperture region AP comprises a first aperture region J1 and a second aperture region J2. In each aperture region AP, the first aperture region J1 and the second aperture region J2 are continuously provided in the second direction Y. When voltage is applied to the liquid crystal layer LC, the rotational state of liquid crystal molecules LM in the first aperture region J1 is different from the rotational state of liquid crystal molecules LM in the second aperture region J2. Hereinafter, a virtual line passing through the boundary between the first aperture region J1 and the second aperture region J2 is referred to as a reference line RL. The reference line RL passes through the center portion of the pixel PX in the second direction Y.

In all the subpixels SP1, SP2 and SP3, the first aperture region J1 extends in the third direction d3, and the second aperture region J2 extends in the fourth direction d4. In each pixel PX such as the first pixel PX1, the first aperture regions J1 of the subpixels SP1, SP2 and SP3 have the same first length LE1$a$ in the second direction Y, and the second aperture regions J2 of the subpixels SP1, SP2 and SP3 have the same second length LE1b in the second direction Y. In modification example 3, in each pixel PX such as the first pixel PX1, the first length LE1$a$ is the same as the second length LE1b. However, in a manner different from that of modification example 3, the first length LE1$a$ may be different from the second length LE1b.

In modification example 3, in all the subpixels SP1, SP2 and SP3 of the first pixel PX1, the main electrode portions PB of the pixel electrodes PE are located on the aperture regions AP. Each main electrode portion PB extends in the third direction d3 in the first aperture region J1, is bent on the reference line RL, and extends in the fourth direction d4 in the second aperture region J2.

In a plan view in which the subpixel SP1 is located on the left side and the subpixel SP3 is located on the right side, each main electrode portion PB has the shape of the symbol "<". In a manner different from that of modification example 3, each main electrode portion PB may have the shape of the symbol ">".

As is clear from the shape of each aperture region AP (each first aperture region J11 and each second aperture region J2) and the shape of each main electrode portion PB, the rotational direction of the director in each first aperture region J1 is different from the rotational direction of the director in each second aperture region J2. Each aperture region AP comprises four types of domains in which the rotational direction of the director differs depending on the domain. In this way, the display panel PNL can be excellent in the property of viewing angle. The shape and size of each pixel electrode PE are the same in all types of pixels PX.

In modification example 3, an effect similar to that of the above embodiment can be obtained.

Modification Example 4 of Embodiment

Figure 21:
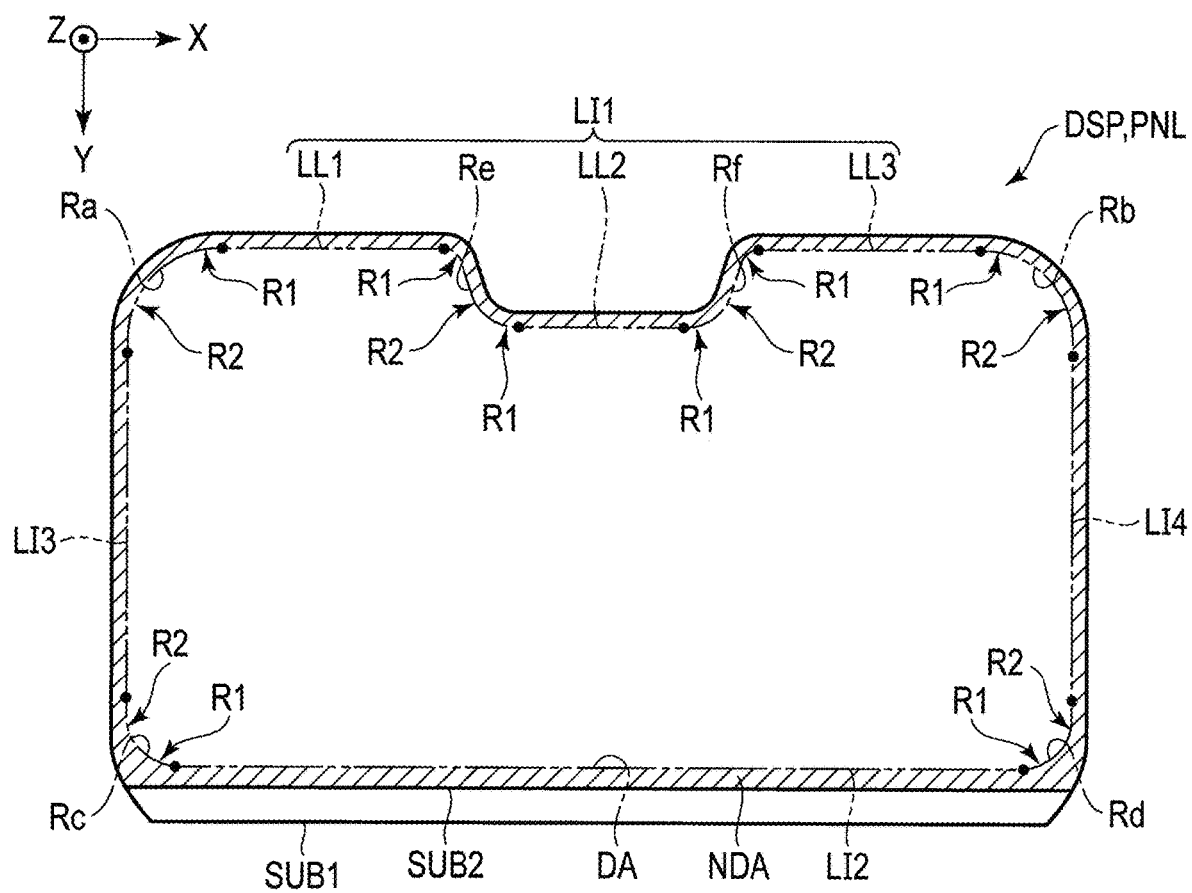
FIG. 21 is a plan view showing the external appearance of the display device of modification example 4 of the embodiment, and shows the display area, etc.

Now, this specification explains the display device DSP of modification example 4 of the above embodiment. FIG. 21 is a plan view showing the external appearance of the display device DSP of modification example 4 of the embodiment, and shows the display area DA, etc.

As shown in FIG. 21, the shape of the display area DA of modification example 4 may be different from that of the above embodiment. The display area DA comprises a pair of long sides LI1 and LI2 extending in the first direction X, a pair of short sides LI3 and LI4 extending in the second direction Y, and four round portions Ra, Rb, Rc and Rd. The long sides LI1 and LI2 and the short sides LI3 and LI4 are directly connected to adjacent round portions. The long side LI2 and the short sides LI3 and LI4 are equivalent to linear portions.

The long side LI1 does not linearly extend in the first direction X, and is partially dented to the long side LI2 side. The long side LI1 comprises linear portions LL1, LL2 and LL3 extending in the first direction X, and two round portions Re and Rf. The linear portions LL1, LL2 and LL3 are directly connected to adjacent round portions. From the above structures, a notch is formed in the display area DA.

In each of the round portions Ra, Rb, Rc and Rd, both the first round area R1 and the second round area R2 are provided. Similarly, in each of the round portions Re and Rf, both the first round area R1 and the second round area R2 are provided. Compared to a case where only the second round area R2 is provided without providing the first round area R1 in each of the round portions Ra, Rb, Rc, Rd, Re and Rf, the outline of each round portion can be optically blurred, thereby making the notches of the outline of each round portion inconspicuous.

In modification example 4, an effect similar to that of the above embodiment can be obtained.

Modification Example 5 of Embodiment

Figure 22:
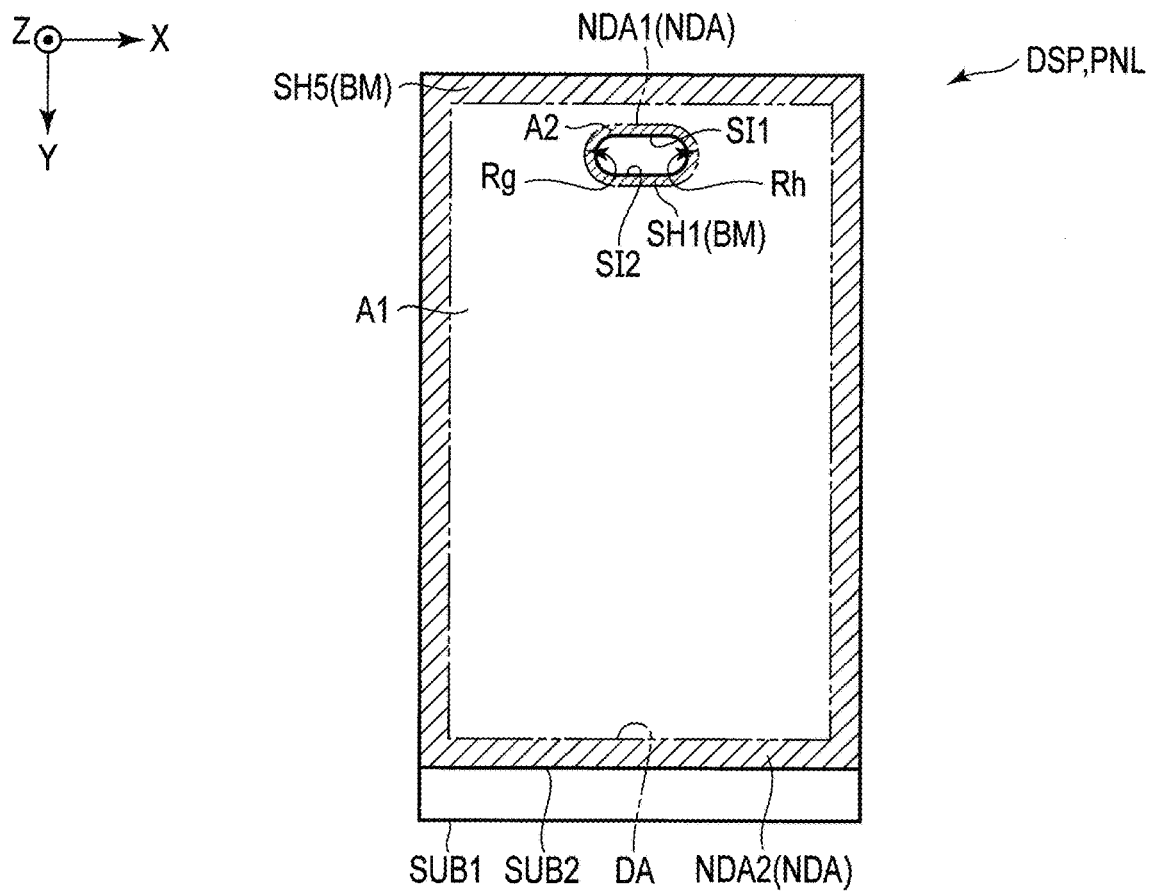
FIG. 22 is a plan view showing the external appearance of the display device of modification example 5 of the embodiment, and shows the display area, etc.

Now, this specification explains the display device DSP of modification example 5 of the above embodiment. FIG. 22 is a plan view showing the external appearance of the display device DSP of modification example 5 of the embodiment, and shows the display area DA, etc.

As shown in FIG. 22, the display area DA of modification example 5 has a quadrangle shape. The outline of the display area DA comprises four corner portions instead of four round portions. The non-display area NDA comprises a first non-display area NDA1 and a second non-display area NDA2. The first non-display area NDA1 is located on the internal side of the display area DA, and is surrounded by the display area DA. The second non-display area NDA2 is located on the external side of the display area DA.

In modification example 5, the first non-display area NDA1 is shaped like an ovally rounded rectangle. The ovally rounded rectangle of modification example 5 comprises two sides having the same length and parallel to the first direction X, and two semicircles having the same radius. The second area A2 is substantially located in the first non-display area NDA1, has a frame shape, and has an inner peripheral border shaped like an ovally rounded rectangle and an outer peripheral border shaped like an ovally rounded rectangle.

The light-shielding layer BM further comprises a frame-like fifth light-shielding portion SH5 located in the second non-display area NDA2. The first light-shielding portion SH1 is located in the second area A2, and is not located in the area surrounded by the second area A2 in the first non-display area NDA1.

Of the display area DA, the inner peripheral border adjacent to the first non-display area NDA1 comprises a pair of sides SI1 and SI2 extending in the first direction X, and two round portions Rg and Rh.

Figure 23:
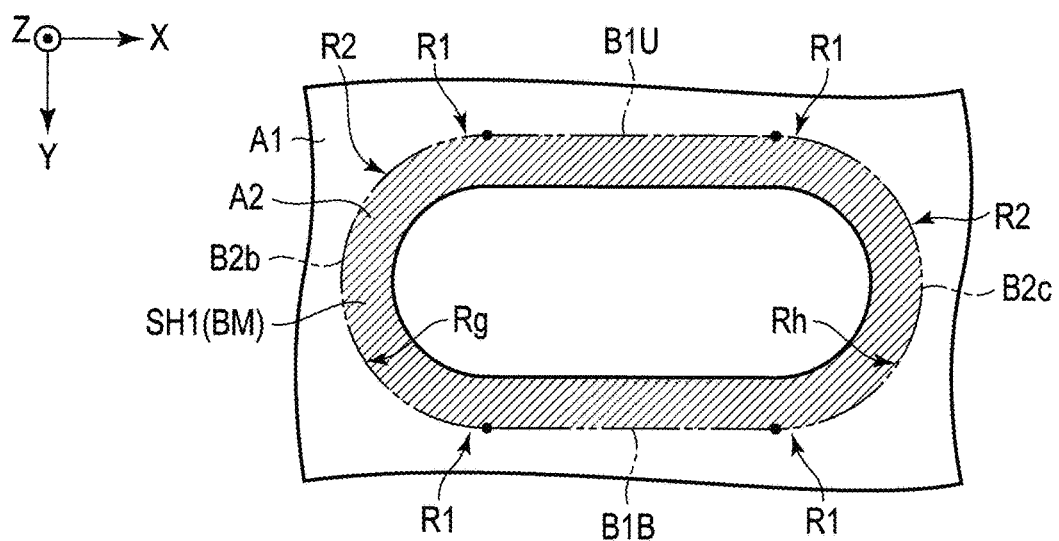
FIG. 23 is a plan view showing part of the display device of FIG. 22.

FIG. 23 is a plan view showing part of the display device DSP shown in FIG. 22.

As shown in FIG. 23, the boundary B comprises the linear first boundary B1 and the curved second boundary B2 connected to the first boundary, and has a frame shape. In modification example 5, the boundary B extends along the ovally rounded rectangle. The boundary B comprises the first boundary B1U located on the upper side of the first area A1 and parallel to the first direction X, a first boundary B1B located on the lower side of the first area A1 and parallel to the first direction X, a second boundary B2b located on the left side of the first area A1, extending along a semicircle and connected to the first boundary B1U and the first boundary B1B, and a second boundary B2c located on the right side of the first area A1, extending along a semicircle and connected to the first boundary B1U and the first boundary B1B.

The second boundary B2b corresponds to the round portion Rg. The second boundary B2c corresponds to the round portion Rh.

In the area through which the second boundary B2b passes, both the first round area R1 and the second round area R2 are provided. Similarly, in the area through which the second boundary B2c passes, both the first round area R1 and the second round area R2 are provided. Compared to a case where only the second round area R2 is provided without providing the first round area R1 in each of the round portions Rg and Rh, the outline of each round portion can be optically blurred, thereby making the notches of the outline of each round portion inconspicuous.

In modification example 5, an effect similar to that of the above embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or examples as would fall within the scope and spirit of the inventions. It is possible to combine two or more of the embodiments and the examples with each other if needed.

What is claimed is:

1. A display device comprising:
a first area including a display area;
a second area including a part of the display area, and adjacent to the first area;
a boundary between the first area and the second area, the boundary comprising a linear first boundary parallel to a first direction and a curved second boundary connected to the linear first boundary, the boundary surrounding the first area; and
a light-shielding layer comprising a first light-shielding portion located in the second area and a plurality of aperture regions, and adjusting a light-transmissive area, wherein
an end portion of the first light-shielding portion on the first area side comprises:
a straight linear first end portion located on the linear first boundary;
a curved linear second end portion located on the curved second boundary in a first round area through which the curved second boundary passes and in which an angle between a tangent to the curved second boundary and an extension of the linear first boundary is less than a reference value; and
a stepwise linear third end portion which extends such that the stepwise linear third end portion is bent in a second round area through which the curved second boundary passes and in which the angle is greater than or equal to the reference value,
the boundary is equivalent to an ideal outline of the display area,
the end portion of the first light-shielding portion is an edge of the first light-shielding portion on the first area side,
each of the straight linear first end portion, the curved linear second end portion, and the stepwise linear third end portion forms a part of an outline of each of corresponding aperture regions of the aperture regions, and
in the aperture regions,
the aperture regions adjusted by the straight linear first end portion don't include an aperture region across the ideal outline,
the aperture regions adjusted by the curved linear second end portion don't include the aperture region across the ideal outline, and
the aperture regions adjusted by the stepwise linear third end portion include the aperture region across the ideal outline,
the curved linear second end portion is located between the straight linear first end portion and the stepwise linear third end portion,
the straight linear first end portion, the curved linear second end portion and the stepwise linear third end portion are continuously arranged,
the light-shielding layer further comprises
a plurality of second light-shielding portions and a plurality of third light-shielding portions at least located in the first area and intersecting each other,
the aperture regions are surrounded by the first light-shielding portion, the second light-shielding portions and the third light-shielding portions,
the second light-shielding portions extend in the first direction, and are arranged at intervals in a second direction intersecting the first direction, and
the third light-shielding portions extend in the second direction, and are arranged at intervals in the first direction,
the third light-shielding portions comprise:
a third light-shielding portion belonging to a first group and including:
a third linear portion having a third width in the first direction, and forming an outline of each of the aperture regions located in a first display area which includes a straight area and does not include the first round area and the second round area, the straight area through which the linear first boundary passes and which extends in parallel with the linear first boundary in the first area; and
a fourth linear portion having a fourth width greater than the third width in the first direction, and adjusting an outline of each of the aperture regions located in the second round area; and
a third light-shielding portion belonging to a second group and including:
the third linear portion having the third width in the first direction, and forming the outline of each of the aperture regions located in the first display area; and a fifth linear portion having the third width in the first direction, forming an outline of each of the aperture regions located in the first round area, each of the aperture regions located in the second round area is shorter than each of the aperture regions located in the first display area in the first direction, and the display area includes the first display area.

2. The display device of claim 1, further comprising a color filter located in the aperture regions, wherein when the aperture regions transmitting light of a same color are compared with each other, an area of each of the aperture regions located in the second round area is less than an area of each of the aperture regions located in a first display area which includes a straight area and does not include the first round area and the second round area, the straight area through which the linear first boundary passes and which extends in parallel with the linear first boundary in the first area, and the display area includes the first display area.

3. The display device of claim 2, wherein the color filter comprises a plurality of first color layers, a plurality of second color layers and a plurality of third color layers, and the first color layer, the second color layer or the third color layer is located in each of the aperture regions.

4. The display device of claim 1, wherein each of the second light-shielding portions includes:

a first linear portion having a first width in the second direction, and forming an outline of each of the aperture regions located in the first round area and a first display area which includes a straight area and does not include the first round area and the second round area, the straight area through which the linear first boundary passes and which extends in parallel with the linear first boundary in the first area; and a second linear portion having a second width greater than the first width in the second direction, and adjusting an outline of each of the aperture regions located in the second round area, and each of the aperture regions located in the second round area in the second direction is shorter than each of the aperture regions located in the first display area in the second direction.

5. The display device of claim 4, wherein the second round area extends in the first direction, the first width is constant, and the second width is increased in stages with distance from the first linear portion in the first direction.

6. The display device of claim 1, wherein the second round area extends in the first direction, the third light-shielding portions comprise a plurality of third light-shielding portions belonging to the first group, the third width is constant, and when the fourth linear portions and the third linear portion arranged in the first direction are noted, the fourth width is increased in stages with distance from the third linear portion in the first direction.

7. The display device of claim 1, wherein each of the second light-shielding portions linearly extends in the first direction, each of the third light-shielding portions extends in a third direction different from the first direction and the second direction, and a fourth direction different from the first direction, the second direction and the third direction, and when a pair of aperture regions adjacent to each other in the second direction is noted, one of the aperture regions extends in the third direction, and the other aperture regions extends in the fourth direction.

8. A display device comprising:

a first area including a display area;

a second area including a part of the display area, and adjacent to the first area;

a boundary between the first area and the second area, the boundary comprising a linear first boundary parallel to a first direction and a curved second boundary connected to the linear first boundary, the boundary surrounding the first area;

a plurality of pixels arranged in matrix in the first direction and a second direction intersecting the first direction, each of the pixels comprising a plurality of subpixels of a plurality of colors arranged in the first direction; and a light-shielding layer comprising a first light-shielding portion located in the second area, and forming an outline of an aperture region of each of the subpixels, wherein the pixels include:

N or more pixels continuously arranged in the first direction in a first round area through which the second boundary passes;

a pixel located in a second round area through which the second boundary passes, or less than N pixels continuously arranged in the first direction in the second round area; and a plurality of pixels located in a first display area which includes a straight area and does not include the first round area and the second round area, the straight area through which the linear first boundary passes and which extends in parallel with the linear first boundary in the first area, an end portion of the first light-shielding portion on the first area side comprises:

a straight linear first end portion located on the linear first boundary in the straight area;

a curved linear second end portion located on the curved second boundary in the first round area; and a stepwise linear third end portion which extends such that the stepwise linear third end portion is bent in the first direction and the second direction in the second round area, the display area includes the first display area, the boundary is equivalent to an ideal outline of the display area, the end portion of the first light-shielding portion is an edge of the first light-shielding portion on the first area side, each of the straight linear first end portion, the curved linear second end portion, and the stepwise linear third end portion forms a part of an outline of each of corresponding aperture regions of the aperture regions, and in the aperture regions, the aperture regions adjusted by the straight linear first end portion don't include an aperture region across the ideal outline, the aperture regions adjusted by the curved linear second end portion don't include the aperture region across the ideal outline, and the aperture regions adjusted by the stepwise linear third end portion include the aperture region across the ideal outline, the light-shielding layer further comprises a plurality of second light-shielding portions and a plurality of third light-shielding portions at least located in the first area and intersecting each other, and defines the aperture regions, the second light-shielding portions extend in the first direction and are arranged such that the second light-shielding portions alternate with the aperture regions in the second direction, the third light-shielding portions extend in the second direction and are arranged such that the third light-shielding portions alternate with the aperture regions in the first direction, the third light-shielding portions comprise:

a third light-shielding portion belonging to a first group and including:

a third linear portion having a third width in the first direction, and forming an outline of each of the aperture regions located in the first display area; and a fourth linear portion having a fourth width greater than the third width in the first direction, and adjusting an outline of each of the aperture regions located in the second round area; and a third light-shielding portion belonging to a second group and including:

the third linear portion having the third width in the first direction, and forming the outline of each of the aperture regions located in the first display area; and a fifth linear portion having the third width in the first direction, and forming an outline of each of the aperture regions located in the first round area, and each of the aperture regions located in the second round area is shorter than each of the aperture regions located in the first display area in the first direction.

9. The display device of claim 8, wherein a total area of the aperture regions of each of the pixels located in a second display area including the first round area and the second round area is less than a total area of the aperture regions of each of the pixels located in the first display area, and the display area includes the second display area.

10. The display device of claim 8, further comprising:

a color filter located in the aperture regions, wherein when the aperture regions transmitting light of a same color are compared with each other, an area of each of the aperture regions located in the second round area is less than an area of each of the aperture regions located in the first display area.

11. The display device of claim 10, wherein the color filter comprises a plurality of first color layers, a plurality of second color layers and a plurality of third color layers, and the first color layer, the second color layer or the third color layer is located in each of the aperture regions.

12. The display device of claim 8, wherein a second light-shielding portion of the second light-shielding portions includes:

a first linear portion forming an outline of each of the aperture regions located in the first display area and the first round area, and having a first width in the second direction; and a second linear portion adjusting an outline of each of the aperture regions located in the second round area, and having a second width greater than the first width in the second direction, and each of the aperture regions located in the second round area is shorter than each of the aperture regions located in the first display area in the second direction.

13. The display device of claim 12, wherein the pixels located in the first display area are a plurality of first pixels, the pixels located in the first round area are a plurality of second pixels, the pixels located in the second round area include a third pixel and a fourth pixel in which a proportion of an area located on the second area is greater than the proportion of the third pixel, the second round area extends in the first direction, the second pixels and the first pixel are arranged in order in the first direction, the fourth pixel, the third pixel and the first pixel are arranged in order in e first direction, the first width is constant, and in the second linear portion, the second width of a portion adjusting an outline of each of the aperture regions of the fourth pixel is greater than the second width of a portion adjusting an outline of each of the aperture regions of the third pixel.

14. The display device of claim 8, wherein the pixels located in the first display area are a plurality of first pixels, the pixels located in the first round area are a plurality of second pixels, the pixels located in the second round area include a third pixel and a fourth pixel in which a proportion of an area located on the second area is greater than the proportion of the third pixel, the second round area extends in the first direction, the third light-shielding portions comprise a plurality of third light-shielding portions belonging to the first group, the second pixels and the first pixel are arranged in order in the first direction, the fourth pixel, the third pixel and the first pixel are arranged in order in the first direction, the third width is constant, and the fourth width of the fourth linear portion adjusting an outline of the aperture region of the fourth pixel is greater than the fourth width of the fourth linear portion adjusting an outline of the aperture region of the third pixel.

15. The display device of claim 8, wherein each of the second light-shielding portions linearly extends in the first direction, each of the third light-shielding portions extends in a third direction different from the first direction and a fourth direction different from the first direction, the second direction and the third direction, and when a pair of aperture regions adjacent to each other in the second direction is noted, one of the aperture regions extends in the third direction, and the other aperture region extends in the fourth direction.

16. The display device of claim 8, further comprising:

an array substrate;

a counter-substrate comprising the light-shielding layer and facing the array substrate with a gap therebetween; and a liquid crystal layer held between the array substrate and the counter-substrate and structuring the pixels together with the array substrate and the counter-substrate.

17. The display device of claim 16, wherein the array substrate comprises a plurality of scanning lines and a plurality of signal lines, each of the scanning lines faces the corresponding second light-shielding portion and extends along the corresponding second light-shielding portion, and each of the signal lines faces the corresponding third light-shielding portion and extends along the corresponding third light-shielding portion.

\* \* \* \* \*